United States Patent
Dautreuil et al.

(10) Patent No.: US 12,017,194 B2
(45) Date of Patent: Jun. 25, 2024

(54) SYSTEMS AND METHODS FOR IMPROVED BLENDING OF AGENTS IN CHEMICAL APPLICATIONS

(71) Applicant: CMS TECHNOLOGY, LLC, Chicago, IL (US)

(72) Inventors: Francis Dautreuil, Seabrook, TX (US); John Meccia, Ringoes, NJ (US); James Dietrich, Harrisburg, PA (US); Douglas Kroitsch, Midland Park, NJ (US); William Randy Darr, Corsicana, TX (US); Ron Shapira, New York, NY (US)

(73) Assignee: CMS TECHNOLOGY, LLC, Chicago, IL (US)

( * ) Notice: Subject to any disclaimer, the term of this patent is extended or adjusted under 35 U.S.C. 154(b) by 886 days.

(21) Appl. No.: 16/346,699

(22) PCT Filed: Nov. 1, 2017

(86) PCT No.: PCT/US2017/059529
§ 371 (c)(1),
(2) Date: May 1, 2019

(87) PCT Pub. No.: WO2018/085398
PCT Pub. Date: May 11, 2018

(65) Prior Publication Data
US 2019/0255495 A1   Aug. 22, 2019

Related U.S. Application Data

(60) Provisional application No. 62/415,669, filed on Nov. 1, 2016.

(51) Int. Cl.
*B01F 35/221* (2022.01)
*A22C 21/00* (2006.01)
(Continued)

(52) U.S. Cl.
CPC .......... *B01F 35/2217* (2022.01); *A22C 21/00* (2013.01); *B01F 25/54* (2022.01);
(Continued)

(58) Field of Classification Search
CPC ...... B01F 25/54; B01F 25/50; B01F 35/2022; B01F 25/102; A22B 5/0082; A22C 21/00
(Continued)

(56) References Cited

U.S. PATENT DOCUMENTS 5,348,389 A    9/1994   Jonsson et al.
5,785,933 A *  7/1998   Cunningham ....... B01J 19/2465
                                            422/224

(Continued)

FOREIGN PATENT DOCUMENTS

EP    1310361 A2    5/2003
EP    1305107 B1    9/2006
(Continued)

OTHER PUBLICATIONS

Peracetic Acid Acute Exposure Guidline Levels, National Research Council Committee on Acute Exposure Guidline Levels. Acute Exposure Guideline Levels for Selected Airborne Chemicals: vol. 8. Washington (DC): National Academies Press (US); 2010.*
(Continued)

*Primary Examiner* — Marc C Howell
(74) *Attorney, Agent, or Firm* — CHRISTENSEN O'CONNOR JOHNSON KINDNESS PLLC

(57) ABSTRACT

The present disclosure provides improved systems and methods for the blending of active agents into process fluids.

31 Claims, 3 Drawing Sheets

(51) Int. Cl.
  *B01F 25/54* (2022.01)
  *B01F 35/21* (2022.01)
  *A22B 5/00* (2006.01)
  *B01F 101/48* (2022.01)

(52) U.S. Cl.
  CPC ......... *B01F 35/2112* (2022.01); *A22B 5/0082* (2013.01); *A22C 21/0061* (2013.01); *B01F 2101/48* (2022.01)

(58) Field of Classification Search
  USPC ....................................................... 366/132
  See application file for complete search history.

(56) References Cited

U.S. PATENT DOCUMENTS

| | | | |
|---|---|---|---|
| 5,874,049 | A | 2/1999 | Ferri, Jr. et al. |
| 5,924,794 | A | 7/1999 | O'Dougherty et al. |
| 6,796,703 | B2 | 9/2004 | Lemke |
| 6,923,568 | B2 | 8/2005 | Wilmer et al. |
| 7,077,967 | B2 * | 7/2006 | Perkins ............ C02F 1/008 |
| | | | 210/764 |
| 7,344,298 | B2 | 3/2008 | Wilmer et al. |
| 7,661,871 | B2 | 2/2010 | Hyatt et al. |
| 7,905,653 | B2 | 3/2011 | Wilmer et al. |
| 9,260,360 | B2 | 2/2016 | Cao et al. |
| 9,452,397 | B2 | 9/2016 | Komiya et al. |
| 9,770,804 | B2 | 9/2017 | Byers et al. |
| 9,878,300 | B2 | 1/2018 | Norling |
| 9,932,254 | B2 | 4/2018 | Holm |
| 9,938,161 | B2 | 4/2018 | Ferrari et al. |
| 10,562,151 | B2 | 2/2020 | Byers et al. |
| 10,974,211 | B1 | 4/2021 | Beason et al. |
| 11,350,640 | B1 | 6/2022 | Bullard et al. |
| 2004/0115322 | A1 | 6/2004 | Osborn |
| 2004/0151062 | A1 | 8/2004 | Yao et al. |
| 2005/0151117 | A1 | 7/2005 | Man et al. |
| 2006/0110505 | A1 | 5/2006 | Norbury |
| 2007/0025897 | A1 * | 2/2007 | Rheingans ............ A61L 2/18 |
| | | | 422/292 |
| 2009/0201760 | A1 * | 8/2009 | Vorage ............ B01F 25/104 |
| | | | 366/163.1 |
| 2009/0282847 | A1 * | 11/2009 | Bullard ............ A23B 4/30 |
| | | | 62/177 |
| 2011/0153084 | A1 | 6/2011 | Wilmer et al. |
| 2014/0269144 | A1 * | 9/2014 | Ayo ............ B01F 35/2134 |
| | | | 366/8 |
| 2016/0058023 | A1 | 3/2016 | Mullen et al. |
| 2017/0207248 | A1 | 7/2017 | Sun et al. |
| 2019/0255495 | A1 | 8/2019 | Shapira et al. |
| 2019/0382293 | A1 | 12/2019 | Lloyd |

FOREIGN PATENT DOCUMENTS

| | | |
|---|---|---|
| EP | 1542789 B1 | 11/2006 |
| EP | 3010621 A1 | 4/2016 |
| EP | 2920662 B1 | 5/2019 |
| EP | 3564771 A2 | 11/2019 |
| EP | 3564771 A3 | 3/2020 |
| WO | 2014/201115 A1 | 12/2014 |
| WO | 2020/112001 A1 | 6/2020 |

OTHER PUBLICATIONS

International Search Report and Written Opinion issued in PCT/US2017/059529, dated Mar. 8, 2018.
International Preliminary Report on Patentability and Written Opinion issued in PCT/US2017/059529, dated May 16, 2019.
Australian Examination Report No. 3 dated May 11, 2023, issued in corresponding Australian App. No. 2017355417, filed on Nov. 1, 2017, 3 pages.
Canadian Office Action dated Nov. 27, 2023, issued in the corresponding Canadian Application No. 3,041,841, filed on Nov. 1, 2017, 10 pages.

\* cited by examiner

SYSTEMS AND METHODS FOR IMPROVED BLENDING OF AGENTS IN CHEMICAL APPLICATIONS

CROSS-REFERENCE TO RELATED APPLICATIONS

The present application is the National Stage Application of International Patent Application No. PCT/US2017/059529, "Systems and Methods for Improved Blending of Agents in Chemical Applications" (filed Nov. 1, 2017), which claims priority to and the benefit of U.S. patent application No. 62/415,669, "Systems and Methods for Improved lending of Agents in Chemical Applications" (filed Nov. 1, 2016), the entireties of which applications are incorporated herein by reference for any and all purposes.

TECHNICAL FIELD

The present disclosure relates to the field of fluid handling and to the field of blending and communication of chemical agents.

BACKGROUND

Existing chemical process applications (e.g., food sanitation systems such as carcass cleaning) are based on forming a process fluid—such as a blend of a chemical agent such as peroxyacetic acid (PAA) with water—and then communicating that process fluid to a use or treatment location, e.g., a dip tank, a spray area, and the like. Existing approaches typically create the process fluid by injecting a slug or bolus of the chemical agent (e.g., PAA) into a line (e.g., a water line) upstream of the treatment location, so as to give rise to the process fluid.

This existing approach, however, presents several drawbacks. First, this approach provides poor control over levels of the chemical agent in the process fluid, as slug-type introduction of the treatment agent does not provide for good mixing. Second, this approach can present user hazards resulting from high levels of treatment agent vapor in the area of the use location. Accordingly, there is a need in the art for improved systems and methods of blending chemical agents (e.g., oxidizing agents, halogens, etc.) into process streams.

SUMMARY

As explained above, existing approaches to forming chemically active fluids present a number of drawbacks. As one example, the addition of high concentrations of chemical (e.g., oxidizing) agent to a water line via in-line injection of the agent results in poor and inconsistent mixing of that chemical agent. This in turn leads to fluctuating levels of chemical agent in the fluid that is supplied to the use location. Because of these inconsistent levels of agent, users of existing systems must use excess material as to ensure that the levels of agent at the use location at all times meet or exceed the levels needed to effect the desired outcomes (e.g., disinfection of foodstuffs) at the use location. This in turn results in the wasteful use of unnecessary amounts of the chemical agents, and can often result in the related wasteful use of unnecessary amount of water and/or other carriers.

The unnecessarily high amounts of chemical agent can also lead to excessive levels of chemical agent vapor in the environment of the treatment location. This can in turn result in hazardous physical exposure and irritation for those working in the use location environment, including the potential to exceed OSHA, NIOSH, and/or other regulatory limits.

In addressing these needs, the present disclosure provides, inter alia, automated, closed-loop chemical control systems to reduce process variation. In one embodiment, the present disclosure provides systems, the systems comprising: a mixing tank, the mixing tank being capable of fluid communication with an input source of at least one carrier and with at least one input source of one or more chemical agents, a sensor in fluid communication with a recirculation line, the recirculation line being capable of fluid communication with the mixing tank, and the sensor being configured to measure a level of the one or more chemical agents in the recirculation line.

Also provided are methods, the methods comprising: introducing to a mixing tank an amount of carrier (e.g., a diluent), and an amount of one or more chemical agents so as to give rise to an process fluid; transporting at least some of the process fluid to a recirculation line in fluid communication with the mixing tank; measuring a level of the one or more chemical agents in the process fluid of the recirculation line; based at least in part on the level of the one or more chemical agents in the fluid of the recirculation line, transporting at least some of the process fluid in of the recirculating line to a use location; and exposing a sample at the use location to the process fluid.

Additional methods provided herein comprise: contacting a first flow of process fluid having a first content of one or more chemical agents and a second flow of a process fluid having a second content of one or more chemical agents so as to form a combined flow, the first flow of process fluid originating from a first mixing tank and the second flow of process fluid originating from a second mixing tank; assaying a level of one or more chemical agents in the combined flow; and modulating the first flow, the second flow, or both in response to the level of one or more chemical agents in the combined flow. Without being bound to any particular theory, the disclosed technology may result in production of homogeneous process fluids, as compared to the heterogeneous fluids produced by existing in-line injection approaches.

The present disclosure also provides continuous systems, comprising: a mixing tank, the mixing tank being configured to receive a carrier from an input source of a carrier and being configured to receive a chemical agent from at least one input source of a chemical agent; a sensor in fluid communication with a recirculation line capable of fluid communication with the mixing tank, the recirculation line configured to receive process fluid from the mixing tank, and the sensor being configured to measure a level of the chemical agent in the recirculation line, the system being configured to give rise to a process fluid in the recirculation line that comprises the carrier and the chemical agent, the process fluid being characterized as being substantially homogeneous; the system being configured to release to a use location downstream from the mixing tank (a) process fluid from at least the mixing tank, (b) process fluid from at least the recirculation line, or (c) process fluid from at least both the mixing tank and recirculation line from the mixing tank; and optionally a mixer disposed in fluid communication with the mixing tank.

Also provided are methods, comprising: in a mixing tank, mixing a carrier and a chemical agent so as to give rise to a process fluid that is characterized as substantially homogeneous; transporting at least some of the process fluid to a recirculation line in fluid communication with the mixing tank; determining a level of the chemical agent in the process fluid in the recirculation line; optionally changing the concentration of the chemical agent in the process fluid based at least in part on the level of the chemical agent in the recirculation line; and communicating at least some of the process fluid to a use location.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings.

DETAILED DESCRIPTION OF ILLUSTRATIVE EMBODIMENTS

Figure 1:
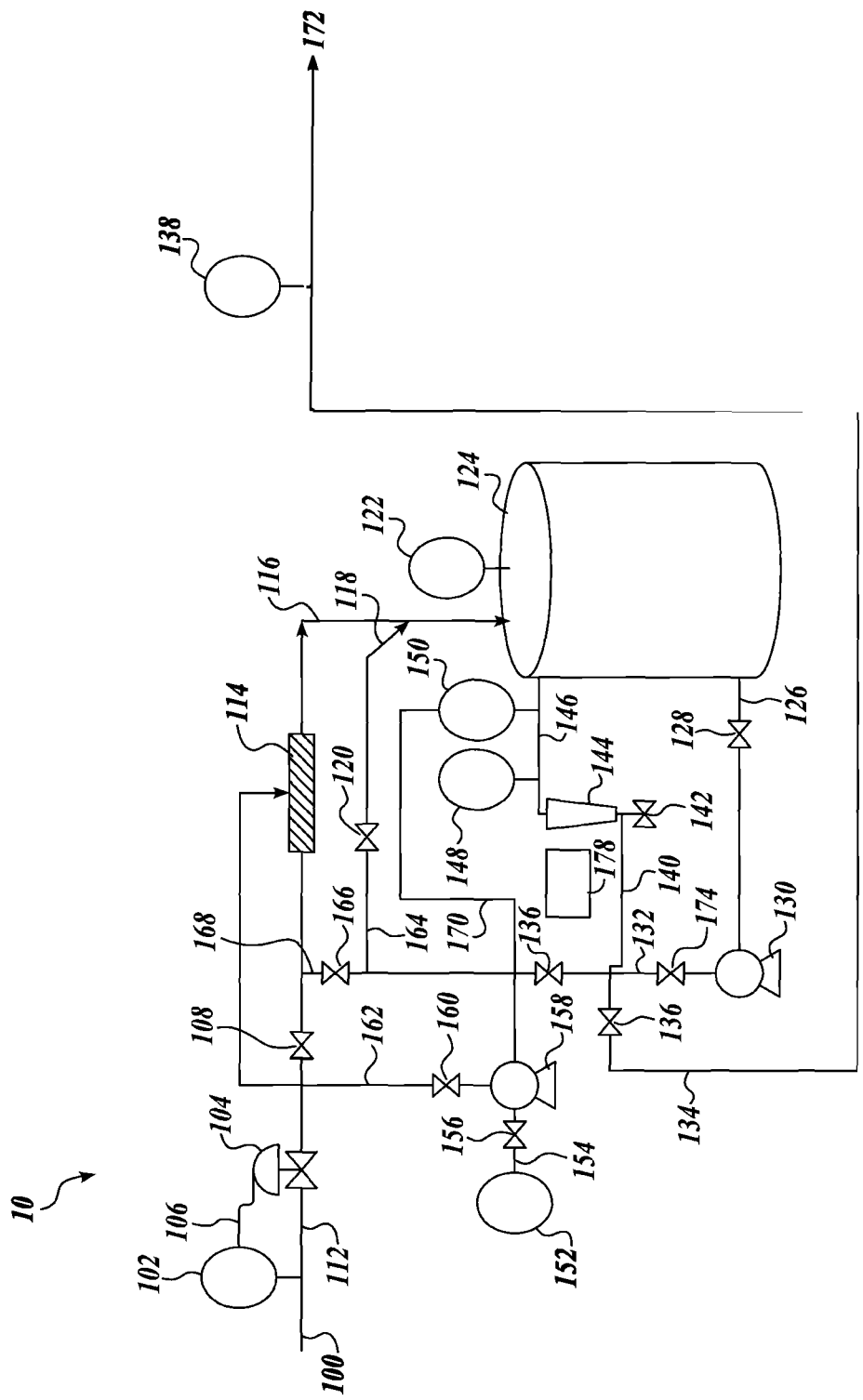
FIG. 1 provides a non-limiting embodiment of the disclosed systems.

The present invention can be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, can also be provided in combination in a single embodiment. Conversely, various features of the invention that are, for brevity, described in the context of a single embodiment, can also be provided separately or in any subcombination. Further, reference to values stated in ranges includes each and every value within that range. Any documents cited herein are incorporated herein by reference in their entireties for any and all purposes.

Terms

It is also to be understood that the terminology used herein is for the purpose of describing particular aspects only and is not intended to be limiting. As used in the specification and in the claims, the term "comprising" may include the embodiments "consisting of" and "consisting essentially of." Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate" includes mixtures of two or more polycarbonates. Furthermore, for example, reference to a filler includes mixtures of fillers.

The term "standard dip tank conditions" refers to a measurement taken 12 inches above the fluid in a 1 gallon dip tank (12 inches×12 inches) that is supplied with fluid at 1 gal/minute, the dip tank being configured such that the fluid level in the dip tank remains essentially constant during the measurement, the measurement being taken under standard temperature and pressure conditions (i.e., 4 deg. C. and 1 atm of pressure).

The term "standard spray cabinet conditions" refers to a measurement taken at approximately 6 feet above floor level outside of a spray cabinet, the spray cabinet including 10 evenly-spaced spray nozzles with a flow rate of 0.5 gal/minute at 15 psi, the spray cabinet being 1.22 meters in length, 0.76 meters high, and 0.76 meters in length (and open on either end to allow entry and exit of treated substrates, such as foodstuffs), with the measurement taken 3 feet from an entrance or exit of the spray cabinet, at the standard temperature and pressure conditions mentioned above.

Ranges can be expressed herein as from one particular value, and/or to another particular value. When such a range is expressed, another aspect includes from the one particular value and/or to the other particular value. For example, a range of "1 to 10" includes all intermediate values. e.g., 3, 5.56, and 7.3. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "1.0" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated +/−10% a variation unless otherwise indicated or inferred. For example, "about 10" encompasses the range from 9 to 11, including 10. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally substituted alkyl" means that the alkyl group can or cannot be substituted and that the description includes both substituted and unsubstituted alkyl groups.

Disclosed are the components useful in preparing the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary.

For example, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent ("wt %") of a component, unless specifically stated to the contrary, is based on the total weight of the formulation or composition in which the component is included. For example if a particular element or component in a composition or article is said to have 8% by weight, it is understood that this percentage is relative to a total compositional percentage of 100% by weight. Molecular weights, where given, are understood to be on a polystyrene basis.

Compounds are described using standard nomenclature. For example, any position not substituted by any indicated group is understood to have its valence filled by a bond as indicated, or a hydrogen atom. A dash ("—") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

Overview

The chemical agent blending and communication systems disclosed herein can be utilized in a wide array of industries and applications, in particular those applications that require controlled dispensing of chemicals in a manner that can, inter alia, (i) dramatically reduce ambient chemical in the local environment that can be adverse to employee conditions and health (e.g., excessive amounts without the system can cause pungent or noxious odors that make for difficult working conditions—often for many hours on a daily basis, excessive amounts that can result in irritation or exceeding certain government limits such as those imposed by NIOSH), (ii) titrate chemicals in a highly efficient manner to avoid inadvertent and inconsistent dispensing of chemical that may be too low to be effective, or too high, which can result in odors, irritation, and excessive consumption beyond what is needed for the chemical's intended effect, and (iii) provide for ongoing monitoring of key parameters as well as the ability to access such data on a 24/7 basis remotely.

As described, existing technologies suffer from inconsistent levels of chemical agents in the fluid that is supplied to the use location. The cause of this is the standard in-line injection approach of adding of slugs of chemical agent into the water lines that supply the use location; the slug addition of the chemical agent results in poor mixing of the chemical agent into the process fluid. Without being bound to any particular theory, the consequences of this approach are (1) the use of unnecessary amount of chemical agent so as to compensate for the concentration peaks and valleys that results from the in-line injection approach; (2) high levels of chemical agent vapor at the use locations, which vapor levels can result in discomfort and even injury to workers at the treatment location. The presently disclosed technology provides a solution to these long-felt needs; by effecting good mixing of the chemical agent at the mixing tank (and at other locations, as may be useful), the present systems allows for well-controlled levels of chemical agent in process fluid, thus avoiding the concentration peaks and valleys that result from existing in-line injection approaches.

Although a number of examples provided herein contemplate peracetic acid (PAA) treatment of foodstuffs, the present technology is not in any way limited to PAA or limited to foodstuff or sanitization applications. As explained herein, the present technology is suitable for use with virtually any chemical agent, and may be used in essentially any application that may require well-blended process fluids.

Description in one aspect, the present disclosure provides continuous systems. A system according to the present disclosure may comprise a mixing tank, the tank being capable of fluid communication with an input source of at least one carrier (e.g., water, a diluent) and with at least one input source of one or more chemical agents.

Suitable diluents include, e.g., aqueous acidic or alkaline mixtures, organic acids (e.g., citric, lactic), phosphoric acid, sulfuric acid, carbonic acid, alcohol, hydrocarbon, fluorinated hydrocarbon, oil, buffer, and the like.

A mixing tank may be, e.g., cubic, spherical, or cylindrical in configuration. The mixing tank may comprise a mixer component configured to mix contents of the mixing tank. Such a component may be, e.g., a stirrer, a magnetic stirrer, and the like.

Inputs to the mixing tank may be introduced at any location of the mixing tank, e.g., at the lid, at the sidewall, at the bottom, or elsewhere. The mixing tank's volume may be essentially any size, depending on the needs of the user. A mixing tank may have a volume of, e.g., about 1 to about 300 gallons. In some embodiments, the mixing tank may have a volume of about 5 gallons; in other embodiments, a mixing tank may have a volume of about 1,000 to about 10,000 gallons. Optionally combined in static mixer before added to mixing tank.

Mixing tanks may be constructed of stainless steel, aluminum, or other metals. Glass and polymeric mixing tanks are suitable. A mixing tank may be single- or multi-walled, and may also include a liner, e.g., a glass liner or liner of other non-reactive material, such as ceramic or other such material.

A mixing tank is suitably capable of fluid communication with a use location (e.g., a treatment or other module) that is downstream from the mixing tank, e.g., a treatment module. (Suitable treatment modules are described elsewhere herein.)

The fluid communication may be continuous—e.g., via direct pipe connection—but may also be modulated by flow control devices, such as valves and the like. Fluids may be communicated within the system by way of pumps, gravity flow, and the like. A fluid flowrate into the mixing tank may be, e.g., from about 1 to about 50 gallons per minute, in some embodiments. In some embodiments, the system is configured such that the net inflow into the mixing tank is equal to the net outflow from the tank such that there is no net fluid accumulation in the tank. In some embodiments, the net inflow into the tank may be within about 10% of the net outflow of the tank.

A system may also be configured to drain or otherwise divert some of the contents of the tank should the fluid volume in the tank reach a certain level. e.g., 90% of the maximum volume that the tank can contain. A system may be configured such that the system does not effect inflow into the tank until the outflow from the tank reaches a certain level, so as to avoid any overflow of the tank. The mixing tank (and any other component of the system) may include one or more drains so as to prevent overflow of the tank/component.

It should be understood that the term "treatment" includes a variety of chemical and physical processes, and is not limited to only foodstuff-related or sanitization applications. For example, a chemical agent tray be an agent that effects oxidation. A chemical agent may be an agent that effects reduction or other processes. Agents that effect oxidation are considered especially suitable for foodstuff sanitizing applications, but the present disclosure contemplates the use of various types of chemical agents in a variety of applications, including applications other than food sanitizing.

A system may also suitably include a sensor in fluid communication with a recirculation line. The recirculation line may be capable of fluid communication with the mixing tank. The recirculation line may also be capable of fluid communication with a use module or use location downstream from the mixing tank. The recirculation line may be a pipe or other conduit. The sensor may directly contact the contents of the recirculation line, although this is not a requirement. The sensor may be in communication with a pump, controller, or other device that is configured to effect communication of from an input source of water, carrier, chemical agent, or any combination thereof into the mixing tank. In this way, the disclosed systems allow for automated control of chemical agent levels.

The ratio of the volume of the recirculation line to the volume of the mixing tank may be from, e.g., 1:1,000,000 to 1,000,000:1 and all intermediate values, e.g., 1,000:1 to 1:1,000, 100:1 to 1:100, or even 10:1 to 1:10, The volume of the recirculation line is suitably equal to or lesser than the volume of the mixing tank, though this is not a requirement.

The system may be configured such that less than all of the fluid disposed within the recirculation e is returned to the mixing tank. In sonic embodiments, from 0.001 to 100% of the fluid within the recirculation line is communicated to the downstream use location. In some embodiments, from 0.001 to 100% of the fluid within the recirculation line is communicated to the mixing tank. The recirculation line may also be diverted from both the mixing tank and away from the downstream use location; this may be used in instances when a user desires that all fluid from the recirculation line be secured and not communicated elsewhere within the system.

A system may further include a pump configured to transport contents of the mixing tank to the recirculation line. In one embodiment, contents from the mixing tank may be communicated from the mixing tank to the recirculation line, where those contents are assayed for the presence of one or more chemical agents. This assaying may be accomplished by the sensor, which may be configured to measure a level of one or more chemical agents in the recirculation line. A pump or other modality may communicate fluid from the recirculation line downstream, e.g., to a treatment module or other location.

The sensor may be in communication (e.g., electronic communication) with one or more mixing tank controllers configured to modulate a flow to the mixing tank from the input source of carrier, the input source of the one or more chemical agents, or any combination thereof. A mixing tank controller may be configured to maintain a range of the chemical agent in the recirculation line, e.g., to maintain a level of PAA in the recirculation line that is less than 1000 ppm but more than 500 ppm. Suitable controllers include PLC controllers and the like.

It should be understood that a system (and method) according to the present disclosure may include one or more controllers and/or control systems. By way of non-limiting example, a user may set (or have set) a desired level of chemical agent in one or more streams of a system, e.g., the recirculation line. The control system may then act to modulate, e.g., the flow of carrier, the flow of chemical agent, the flowrate of a recycle stream (or any other stream), the flow of an additional additive (e.g., a pH-adjusting additive, a preservative, a tracer, and the like) so as to achieve a particular desired level. Inputs to the control system may include, e.g., measurements taken of one or more streams within a process, measurements taken at a use location, or other measurements.

The system may be configured such that the carrier (which may be water, oil, or other fluid) represents from 0.001 to 100% of the volumetric flow rate of fluid introduced into the mixing tank, e.g., from 0.01 to 99%, from 0.1 to 95%, from 1 to 90%, from 5 to 85%, from 10 to 80%, from 15 to 75%, from 20 to 70%, from 25 to 65%, from 30 to 60%, from 35 to 55%, from 40 to 50%, or even 45%.

Likewise, the system may be configured such that the one or more chemical agents represent from 0.001 to 100% of the volumetric flow rate of fluid introduced into the mixing tank. e.g., from 0.01 to 99%, from 0.1 to 95%, from 1 to 90%, from 5 to 85%, from 10 to 80%, from 15 to 75%, from 20 to 70%, from 25 to 65%, from 30 to 60%, from 35 to 55%, from 40 to 50%, or even 45%.

A use location may comprise a dip tank, a spray system, a hose, application stream, vapor applicator, or any combination thereof. Spray systems and dip tanks are considered particularly suitable for applications related to livestock treatment, and are well known to those of ordinary skill in the art.

A mixing tank may be in fluid communication with one, two, or more use locations. It should be understood that a use location may include multiple modalities, e.g., two spray stations, a spray station and a dip tank, a coating applicator, and the like. As described elsewhere herein, a use location may comprise one or more modalities configured to measure a level of one or more species (e.g., the chemical agent, a by-product of the treatment, or other) that may be present at the location. Use locations may also be mixers, conduits, reactors, or other downstream destinations for fluid from the mixing tank.

As one example, a use location may comprise a modality (e.g., a sensor) configured to determine a level of bacteria that may be present on the surface of poultry that has been treated at the use location (e.g., treatment module). Based on the measurements from that modality, the system may be configured to adjust a level of a chemical agent being supplied to the use location, as described elsewhere herein. Alternatively, a user may manually adjust the level of the chemical agent being supplied to the use location. A use location may also comprise a sensor disposed so as to measure the level of one or more agents at the use location.

Systems may also comprise modalities configured to determine the level of a species (e.g., bacteria) at a location upstream or downstream from the use location. For example, a system may comprise a testing station disposed downstream from a treatment module. If poultry being tested at the testing station exhibits a level of bacteria that is higher than desired, the system (or a user) may adjust a level of a chemical agent being supplied to the treatment module. (The poultry exhibiting the excessive level of bacteria may also be discarded or re-treated so as to achieve the desired bacteria measurements.)

A user may configure a system to maintain a particular range/level of one or more agents in fluid supplied to the use location, such as a treatment module. Exemplary ranges for certain illustrative agents may be found at, for example:

Chemical Priority Lists for Acute Exposure Guideline Levels (AEGLs)—First List of AEGL Priority Chemicals for Guideline Development, United States EPA, updated May 16, 2016).

Chemical Priority Lists for Acute Exposure Guideline Levels (AEGLs)—Second List of AEGL Priority Chemicals for Guideline Development, United States EPA, updated May 16, 2016).

Chemical Listing and Documentation of Revised IDLH Values (as of Mar. 1, 1995), United States CDC/NIOSH (Dec. 4, 2014).

http://www.fsis.usda.gov/wps/wcm/connect/24346cbd-ad28-4223-8db1-55f067ce3879/antimicrobial.pdf?MOD=AJPERES (United States FDA)

United States NIOSH listing found at http://www.cdc.gov/niosh/idlh/intridl4.html.

a USDA Food Safety and Inspection Service (FSIS) Directive 7120.1

The disclosed technology may be applied to any of the chemical agents listed in the foregoing and to achieve any range of the foregoing agents, including the ranges prescribed above. (All of the foregoing references are incorporated by reference herein in their entireties for any and all purposes.) As but one example, PAA concentrations may range from 5-10 ppm in certain applications, but may also be about 2,000 ppm in other, comparatively high bio-load environments.

A target range may be based on levels of chemical agent in the recirculation line, at one or more locations between the recirculation line and the use location, and also at the use location or even downstream from the use location. In some embodiments, a system may be configured to adjust the level of one or more chemical agents based on measurements of one or more agents taken at one, two, or more locations of the system.

The input source of the chemical agent may be a tank or other container in fluid communication with the mixing tank. The input source may comprise a pump, a valve, a controller, or other modality that effects communication of the chemical agent. As one example, an input source may comprise a pump in communication with a controller, the controller receiving one or more signals related to chemical agent levels elsewhere in the system.

A mixing tank may, in some embodiments, comprise one or more passages placing a headspace of the mixing tank into fluid communication with the environment exterior to the mixing tank. The passages may be direct or tortuous in nature. The mixing tank may also comprise a module configured to actively evacuate (e.g., via blowers or fans) a headspace of the tank. In this way, vapors that a user may not desire to communicate to the downstream use location may be removed before the process fluid is communicated to that use location. A system may be configured so as to place the headspace of the mixing tank into fluid communication with the environment exterior to the tank when the level of one or more species in the headspace reaches a certain level. (The level of the species may be determined by a sensor.)

A system may also be configured so as to place the downstream use location into fluid communication with the environment exterior to the use location when the level of one or more species at the use location (e.g., in the air in the area at or nearby to the use location) reaches a certain level. This may be effected by automated fans, vents, and the like.

Systems may also comprise one or more sensors at the use location, a sensor being configured to measure a level of the one or more chemical agents at the use location. The sensor may be in communication with the mixing tank controller. In this way, the level of a chemical agent at the use location may in turn influence the levels of agents, carrier (e.g., water, diluents) added upstream of the use location. In this way, the systems allows for real-time adjustment of the composition of the fluid being supplied to the use location.

A system may, as described, further comprise a flow control device disposed between the recirculation line and the use location, a flow control device disposed between the recirculation line and the mixing tank, or both. Flow control devices may be valves. A valve may effect complete or partial closure of a passage or vessel. A flow control device may be actuated by a controller, but may also be manually actuated as well.

As discussed herein, the disclosed technology may be applied to virtually any chemical agent. Some exemplary (but non-limiting) chemical agents include, e.g., cetylpyridinium chloride, quaternary ammonium, chloride, chlorine dioxide, bromide, potassium bromate, hydroxide, halogen, organic peroxide, inorganic peroxide, nitrogen dioxide, acid, chlorate, hypochlorite, or any combination thereof.

Acids may be, e.g., organic acids, mineral acids, or combinations of these. Exemplary acids include, e.g., citric acid, lactic acid, acetic acid, phosphoric acid, sulfuric acid, hydrochloric acid, hypobromous acid, an oxyacid, a peroxy acid, a oxalic acid, formic acid, ascorbic acid, propionic acid, or any combination thereof. Peroxyacetic acid (PAA) is considered especially suitable. The present disclosure contemplates that the systems may operate using one, two, or more chemical agents in the process fluid. Other exemplary chemical agents are provided in the FSIS, NIOSH, EPA, and other documents/listings identified elsewhere herein. (All documents cited herein are incorporated by reference in their entireties for any and all purposes.)

The level of chemical agent in the process fluid will vary according to the use to which the system is put, and may also vary according to the user's needs. As one illustrative example, a system may be configured to provide from 1 to 2000 ppm of PAA in a process fluid, e.g., from 5 to 1500 ppm, from 10 to 1000 ppm, from 15 to 900 ppm, from 20 to 850 ppm, from 25 to 800 ppm, from 30 to 700 ppm, and all intermediate values.

It should be understood that a system may comprise inputs of one, two, or more chemical agents. As one example, a system may comprise inputs of both lactic acid and PAA. These inputs may be independently controlled so as to achieve a final level of sanitation in the product (e.g., poultry) being treated. For example, if it is determined that a level of bacteria in a treated poultry product exceeds the desired level, the system may be configured to increase the levels of lactic acid, PAA, or both in the process fluid.

The present disclosure also provides methods. The disclosed methods may comprise, e.g., introducing into a mixing tank an amount of carrier and an amount of one or more chemical agents so as to give rise to an process fluid; transporting at least some of the process fluid to a recirculation line in fluid communication with the mixing tank; measuring a level of the one or more chemical agents in the process fluid of the recirculation line; based at least in part on the level of the one or more chemical agents in the fluid of the recirculation line, transporting at least some of the process fluid in of the recirculating line to an oxidation and/or chemical use location; and exposing a sample at the use location to the process fluid.

The methods may also comprise adjusting at least one of the amount of carrier, and the amount of the one or more chemical agents introduced to the mixing tank in response to the level of the one or more chemical agents in the process fluid of the recirculation line. This may be done, as mentioned, to maintain the level of the one or more agents in the recirculation line within a certain range of levels.

The amount of the one or more chemical agents may be adjusted by introducing additional chemical agent at the mixing tank, at the recirculation line, or both. Adjusting may be effected by a controller in communication with a sensor configured to measure a level of the chemical agent in the recirculation line. The controller may be in communication with one or more devices configured to modulate one or more of the amount of carrier, and the amount of the chemical agent.

The methods may further comprise transporting at least some of the process fluid of the recirculation line back to the mixing tank. The amount of process fluid transported back to the mixing tank may be based at least in part on the level of the one or more chemical agents in the process fluid of the recirculation line. As described elsewhere herein, the level of chemical agent in the recirculation line may be assessed by a sensor in communication with the recirculation line.

The methods may also include placing a headspace of the mixing tank into fluid communication with the environment exterior to the mixing tank. One may also remove at least some of a gas in a headspace of the mixing tank to the environment exterior to the mixing tank. As described elsewhere herein, this may be effected by fans, blowers, and the like. A user may also open a closure disposed between the headspace of the mixing tank and the environment exterior to the tank.

Additional methods disclosed herein comprise contacting (e.g., intermixing) a first flow of process fluid having a first content of one or more chemical agents and a second flow of a process fluid having a second content of one or more chemical agents so as to form a combined flow, the first flow of process fluid originating from a first mixing tank and the second flow of process fluid originating from a second mixing tank; assaying a level of one or more chemical agents in the combined flow; and modulating the first flow, the second flow, or both in response to the level of one or more chemical agents in the combined flow.

As one example of the foregoing, a first flow of process fluid comprising PAA may originate from a first mixing tank. A second flow of treatment comprising a different acid (e.g., lactic acid) may originate at a second mixing tank, and these first and second flows may be mixed. The mixing may be effected by a Y-shaped or T-shaped junction that converges the first and second flows. The mixing may also be effected by a stirrer, helix, baffles, or other features that encourage mixing between the fluid flows.

The methods include transporting the combined flow to a use location. This may be accomplished by pumping, gravity flow, or otherwise communicating the combined flow to the use location.

Suitable use locations, e.g., treatment modules, are described elsewhere herein. As also described elsewhere herein, the methods may include determining a level of one or more chemical agents at the use location.

The methods also include addition of one or more chemical agents to the first mixing tank, to the first flow, to the second mixing tank, to the second flow, to the combined flow, or any combination thereof. Suitable chemical agents are described elsewhere herein and include, e.g., PAA and other acids. The methods may further include addition of carrier to the first mixing tank, to the first flow, to the second mixing tank, to the second flow to the combined flow, or any combination thereof. The first and second flows may be mixed together such that the ratio in the mixed flow of the volumetric flow of the first flow to the volumetric flow of the second flow is from 1:1000 to 1000:1 and all intermediate values.

Additionally disclosed systems comprise a mixing tank, the mixing tank being capable of fluid communication with an input source of carrier, or both, and with at least one input source of one or more chemical agents. The systems may also comprise a sensor in fluid communication with a recirculation line, the recirculation line being capable of fluid communication with the mixing tank, and the sensor being configured to measure a level of the one or more chemical agents in the recirculation line.

The systems may further comprise a flow control device configured to (a) release fluid from at least the mixing tank, (b) release fluid from at least the recirculation line, or (c)

release fluid from at least both the mixing tank and recirculation line to a use location downstream from the mixing tank.

As an example of system operation, a system may be configured such that fluid from the mixing tank is mixed in the tank (e.g., via a stirrer) and is communicated to the recirculation line. At the recirculation line, the level of one or more agents (e.g., lactic acid, PAA, chlorine) may be measured. If that level is within a certain desired range (thus evidencing the composition of the fluid in the mixing tank), the system may then communicate fluid from the recirculation line, fluid from the mixing tank, or both, to a location downstream of the mixing tank, e.g., a dip tank for poultry treatment, a coating application station, a further reactor or mixer, or other use location employed by the user. In one such embodiment, fluid is communicated directly from the mixing tank, bypassing the recirculation line.

Exemplary Embodiment

FIG. 1 provides an exemplary (non-limiting) system according to the present disclosure. As shown, an exemplary system 10 may include a source 100 of a carrier, e.g., water, alcohol, and the like; chilled water and municipal water are considered suitable. The carrier source 100 may be in fluid communication with primary feed line 112. A flow transmitter 102 may be used to monitor a flow (e.g., a flowrate) in primary feed line 112. A flow control device (e.g., a flow control valve) 104 may be placed so as to modulate a flow within primary feed line 112. Flow control device 104 may be in electronic and/or mechanical communication with flow transmitter 102, and flow control device 104 may be actuated in response to a signal from flow transmitter 102. Although not shown, a system may include a central controller or controller system that effects modulation of one or more flowrates within the system.

Primary feed line 112 may include check valve 108. Primary feed line 112 may also be in fluid communication with mixer 114. Mixer 114 may be a static mixer, although other types of mixers may also be used. Without being bound to any particular theory of operation, mixer 114 may be used to facilitate mixing of the carrier with a chemical agent (discussed infra), e.g., to give rise to a more homogeneous mixture of the carrier and chemical agent. It should be understood that mixer 114 is optional, and need not necessarily be present.

The mixer 114 may be connected with a mixing tank input stream 116, which input stream 116 communicates fluid to mixer tank 124. The input stream 116 may be curved, split, or otherwise shaped so as to give rise to a vortex or other mixing within mixing tank 124. As but one example, input stream 116 may enter mixing tank 124 at an angle so as to give rise to circulating flow. Input stream 116 may enter mixing tank 124 at one, two, or more locations so as to give rise to improved mixing within mixing tank 124. As one example, input stream 116 may have two inlets into mixing tank 124, which inlets may be arranged in a counter-current fashion so as to encourage improved mixing within mixing tank 124. Mixing tank 124 may include a stirrer, baffles, or other features configured to give rise to mixing of the contents of mixing tank 124.

As shown in FIG. 1, mixer 114 may be configured to receive carrier and chemical agent that have not yet reached mixing tank 124. Mixer 114 may be configured to receive carrier and chemical agent that have also passed through the mixer tank 124.

Mixing tank 124 is suitably in fluid communication with mixing tank outlet stream 126. The mixing tank outlet stream 126 may be modulated recirculation line pump 128.

Recirculation line pump 130 may be used to effect movement of the fluid in mixing tank outlet stream 126. Recirculation line pump 130 may pump fluid to recirculation line 132; a recirculation line pump valve 174 may be present and be used to modulate flow within recirculation line 132.

As shown, the recirculation line 132 may supply fluid to downstream flow 134; the flow into downstream flow 134 may be modulated by downstream flow valve 136. A sensor 138 may be used to assess one or more characteristics (e.g., chemical agent content, temperature, flow rate) of downstream flow 134. Fluid from mixing tank outlet stream 132 may be communicated to recycle stream 164. Recycle stream 164 may include a valve 120, which may act to control the flowrate in recycle stream 164. Recycle stream 164 may then connect to input stream 116 via recycle input 118.

Fluid from recirculation line 132 may be communicated to mixing tank analysis stream 140, which is in fluid communication with controller 144. (Mixing tank analysis stream 140 is representative of the recirculation line 132 and fluid leaving mixing tank 124.) Controller 144 may be a programmable logic controller. One or more characteristics of the mixing tank analysis stream may be assessed by a first probe 148 and optionally by a second probe 150. A probe may be, e.g., a pH probe or even a chemical agent probe, i.e., a probe that provides information concerning the level of a given chemical agent or chemical agents in mixing tank analysis stream 140. Analysis recycle stream 146 may be communicated back to mixing tank 124, although this is optional.

Fluid from recirculation line 132 may be modulated by a check valve 176. The fluid may be communicated from recirculation line 132 to primary feed line 112 via recirculation input 168; the flow to input 168 may be modulated by valve 166. Also shown is a monitor 178, which monitor may provide information to a user regarding one or more conditions in the system, flowrates, concentrations, valve status, predicted concentrations, chronological data, and the like. The monitor 178 may include one or more input devices so as to allow a user to view different information or even to effect changes in the system.

It should be understood that a system according to the present disclosure may be configured to assess one or more characteristics of a fluid disposed in the recirculation line. It should also be understood that the disclosed systems may be configured to assess one or more characteristics of a headspace associated with fluid delivered from the recirculation line. For example, a system may be configured to measure the chemical agent concentration in a headspace of a dip tank or a spray cabinet fed by the recirculation line. In this way, a system may be configured to collect information regarding a fluid in the recirculation line as well as information relating to vapor in a headspace above a unit that is fed by the recirculation line. A system may be configured to measure a flowrate of fluid in the recirculation line. A system may be further configured to measure a temperature, pressure, or both at one or more locations within the system. For example, a system may be configured to measure a temperature or pressure within the mixing tank. A system might also be configured to measure a concentration of a chemical agent in the recirculation line and also measure the concentration of the chemical agent in a space above a dip tank that is fed by the recirculation line.

First probe 148 and second probe 150 (if present) may be in communication with chemical agent pump 158 and/or valves 156 and 160 by way of connection 170; chemical agent pump 158 modulates the flow of a chemical agent from chemical agent source 152, e.g., to mixer 114. This modulation may be performed based at least in part on information collected by first and/or second probes 148 and 150. For example, if a probe determines that the level of a given chemical agent in mixing tank analysis stream 140 is too low, additional chemical agent may be introduced from chemical agent source 152. Similarly, if the level of a given chemical agent in mixing tank analysis stream 140 is too high, the introduction of chemical agent may be reduced or even stopped.

As shown, the flow 154 from chemical agent source 152 to chemical agent pump 158 may be modulated by chemical agent source valve 156. The flow 162 from chemical agent pump 158 may be modulated by chemical agent pump valve 160. Although flow 162 from chemical agent pump 158 is shown entering mixer 124, it should be understood that some or all of flow 162 may be introduced to primary feed line 112 before primary feed line 112 enters mixer 124.

A system according to the present disclosure may include one or more controllers configured to modulate the communication and/or relative amounts of carrier, chemical agent, and any other components of the process fluid. As one example, sensors may be used to assess the level of PAA in process fluid and compare that level of PAA to a setpoint or target value. If the level of PAA deviates from that target value, the controllers may modulate one or more of the communication of PAA into the process fluid and the delivery of carrier into the process fluid so as to achieve the desired level of PAA in the process fluid. (As another example, a system may utilize a pH sensor to determine a level of acid in a fluid flow of the system, e.g., the pH of the fluid in the recirculation line. The system may also be configured to modulate flowrates as may be desired. For example, the system may be configured to deliver increased amounts of downstream flow at times of high demand, e.g., in a situation where a poultry processing facility is processing poultry parts at multiple dip tank locations. The system may of course be configured to deliver a reduced amount of downstream flow when reduced amount of such flow are necessary, e.g., when a poultry processing facility has taken one of its dip tanks offline for maintenance.

It should be understood that the disclosed systems and methods may be effected by on-site personnel or effected remotely. As one example, off-site personnel may receive information from the system (e.g., chemical agent vapor levels at a use location, chemical agent levels in a recirculation line).

Exemplary Results

EXAMPLE 1

This example demonstrates the reduction in chemical agent vapors realized by using the disclosed technology in place of a traditional, in-line injection system.

In this example, the control sample was an arrangement using a Dosatron™ device to directly inject a concentrate into a line flowing with carrier water. The Dosatron™ pump draws the concentrate up and releases it into the water flow, which release in turn creates "slugs" or injections of concentrate.

In this example, 22% wt % PAA was diluted to a target concentration of 600 ppm (measured in the liquid) for further communication to three use locations within a poultry processing plant. Two of these use locations (Dip 1, Dip 2) were dip-type approaches where PAA was supplied to an open tank system and the animal part was submerged for treatment. The third use location was a spray application in which the PAA was sprayed on an animal part.

A Chemdaq SafeCide™ portable monitor was used to measure the volatiles of the PAA. The Chemdaq system solubilities the volatiles detected in the atmosphere and measures the PPA concentration in ppm. (See, e.g., "Validation of real time peracetic acid vapor sensor Joseph Donabed, Michael Harvey, Jon Howarth—Enviro Tech Chemical Services," available at http://sq9fvtyjln4ilde25f8dg54r-wpengine.netdna-ssl.com/wp-content/uploads/2017/01/ChemDAQ-Validation-report-TWO-COLUMN-FINAL-1.pdf). In this Example, PAA vapor concentration was measured 12 inches above the dip tanks and 12 inches from the spray unit. The dip tanks were configured such that fluid was removed from the dip tank at a rate that maintained a constant fluid level in the dip tank.

Each data point represents the average concentration (in ppm) of PPA, collected in one second intervals over a one minute time period. Each sample number in Table 1 below represents the average concentration (ppm) of peracetic acid vapor. The average represents 60 measurements taken over a 1 min time interval. (D3S samples are samples according to the disclosed technology, and Dosatron samples are samples according to existing, in-line injection technology.)

Dip 1 samples were taken from a 1-5 gallon capacity dip tank with material entering the tank at a pipe just above the level of the tank at a flowrate of about 1 gallon/minute. The surface area of the dip tank was about 18×18 inches, and the conditions were ambient indoor conditions.

Dip 2 samples were taken from a 5-10 gallon capacity dip tank with material entering the tank at pipe just above the level of the tank at a flow rate of about 1-3 gallons/minute. The surface area of the dip tank was about 18×24 inches.

Spray samples were taken at a flow rate of 3-5 gallons/minute with a pressure of 10-20 psi. The sample measurements were taken from a height of about 6 feet off the floor, at a location outside the spray cabinet where a user would likely be positioned.

TABLE 1

Exemplary Results

| Sample # | Disclosed Technology | | | Comparative - Dosatron | | |
|---|---|---|---|---|---|---|
| | Dip 1 | Dip 2 | Spray | Dip 1 | Dip 2 | Spray |
| 1 | 0.123 | 0.142 | 0.181 | 0.240 | 0.131 | 0.182 |
| 2 | 0.137 | 0.164 | 0.150 | 0.246 | 0.172 | 0.244 |
| 3 | 0.139 | 0.122 | 0.153 | 0.194 | 0.277 | 0.250 |
| 4 | 0.114 | 0.147 | 0.154 | 0.182 | 0.187 | 0.229 |
| avg | 0.129 | 0.144 | 0.159 | 0.216 | 0.192 | 0.226 |
| STD | 0.012 | 0.017 | 0.014 | 0.032 | 0.062 | 0.031 |
| MIN | 0.114 | 0.122 | 0.150 | 0.182 | 0.131 | 0.182 |
| MAX | 0.139 | 0.164 | 0.181 | 0.246 | 0.277 | 0.250 |
| Range | 0.025 | 0.042 | 0.031 | 0.063 | 0.146 | 0.068 |
| Range/Average | 20% | 29% | 19% | 29% | 76% | 30% |
| % STD | 9% | 12% | 9% | 15% | 32% | 14% |
| | Water: 585 ppm by titration | | | Water: 600 ppm by titration | | |

As shown above, samples according to the disclosed technology exhibited a significant reduction in volatiles over the conventional in line injection (Dosatron™) approach. Further, the exemplary samples exhibited a significantly reduced variation in the level of volatiles present as compared to the conventional Dosatron approach; the standard deviation was often less than 10% of the average, which was significantly lower than the comparable figure for comparative Dosatron testing. Further, the range in measurements using the disclosed technology was tighter and did not exhibit the peaks and valleys characteristic of an in-line injection system.

Figure 2:
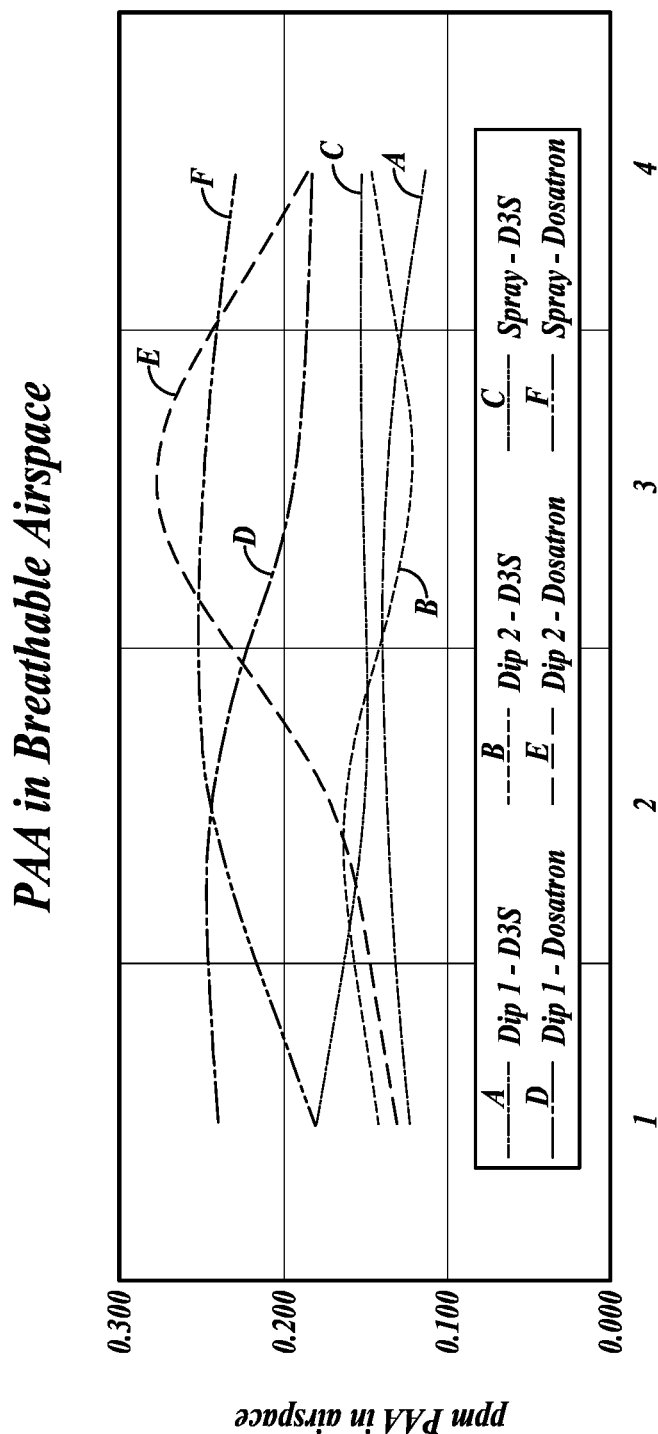
FIG. 2 provides exemplary sampling data.

The data from Table 1 above are also plotted in FIG. 2, attached hereto. A review of FIG. 2 further underscores the superiority of the disclosed technology over existing alternatives. As shown in that figure, line A represents Dip 1 data for the disclosed technology, line B represents Dip 2 data for the disclosed technology, and line C represents spray data for the disclosed technology. Likewise, line D represents Dip 1 data for the conventional approach, line E represents Dip 2 data for the conventional approach, and line F represents spray data for the conventional approach. As shown graphically in FIG. 2, the variability in airspace PPA concentration is significantly lower and significantly less variable when using the disclosed technology than when using the conventional approach.

In particular, line E in FIG. 2 (showing the results of Dip 2—Dosatron) underscores the variability inherent in the conventional process. As shown, the Dip 2—Dosatron line exhibits significant variability over the four samplings. This is due to the inhomogeneity of the PAA present in the sample fluid, and this inhomogeneity contributes to the highly variable PAA airspace content. Indeed, the conveyor that delivers poultry to the clip tank may exacerbate the variability in PAA airspace content—because the conveyor acts to stir up the fluid in the tank, when the conveyor contacts a "hot spot" in the inhomogeneous fluid having a comparatively high level of PAA, that "hot spot" of PAA becomes stirred up and dispersed into the airspace above the dip tank.

EXAMPLE 2

This Example illustrates the improvements in application control achieved by the presently disclosed technology.

In this example, the concentration (of PPA, in ppm) at the point of application was monitored in a finishing dip tank from feeds using (1) an in-line injection method performed using a Dosatron™ device; and (2) a method according to the present disclosure. The objective of this Example is to set a delivery concentration setpoint and then measure the concentration at the point of application, observing the fluctuation in concentration throughout a single day.

For each day, one sample was taken per hour for 12 hours, with the samples taken from the point where material was introduced into the dip tank. The PAA concentration was measured using a Lemotte™ hydrogen peroxide and peracetic acid titration kit (code 7191-02), and the statistical analysis is representative of the 12 samples taken for that day. Table 2 below shows comparative data using the disclosed technology, and Table 3 below shows comparative data using the conventional approach of a Dosatron device.

TABLE 2

Comparative Data - CMD3S (disclosed technology)

Peracetic Acid Concentration in Solution at Application Point

| Day | Average | STD | STD/Average | MIN | MAX | RANGE | % RANGE/AVERAGE |
|---|---|---|---|---|---|---|---|
| 1 | 612 | 97 | 16% | 510 | 780 | 270 | 44% |
| 2 | 613 | 78 | 13% | 510 | 780 | 270 | 44% |
| 3 | 648 | 48 | 7% | 600 | 780 | 180 | 28% |

TABLE 2-continued

Comparative Data - CMD3S (disclosed technology)

Peracetic Acid Concentration in Solution at Application Point

| Day | Average | STD | STD/Average | MIN | MAX | RANGE | % RANGE/AVERAGE |
|---|---|---|---|---|---|---|---|
| 4 | 605 | 66 | 11% | 510 | 750 | 240 | 40% |
| 5 | 619 | 72 | 12% | 510 | 750 | 240 | 39% |
| 6 | 581 | 50 | 9% | 510 | 645 | 135 | 23% |
| 7 | 752 | 93 | 12% | 600 | 885 | 285 | 38% |
| 8 | 693 | 64 | 9% | 600 | 840 | 240 | 35% |
| 9 | 642 | 66 | 10% | 540 | 795 | 255 | 40% |
| 10 | 634 | 56 | 9% | 540 | 750 | 210 | 33% |

CMD3S set point 630 ppm

TABLE 3

Comparative Data - Dosatron (conventional approach)

Peracetic Acid Concentration in Solution at Application Point

| Day | Average | STD | STD/Average | MIN | MAX | RANGE | % RANGE/AVERAGE |
|---|---|---|---|---|---|---|---|
| 1 | 821 | 130 | 16% | 615 | 1140 | 525 | 64% |
| 2 | 806 | 160 | 20% | 525 | 1245 | 720 | 89% |
| 3 | 644 | 127 | 20% | 375 | 930 | 555 | 86% |
| 4 | 809 | 138 | 17% | 570 | 1065 | 495 | 61% |
| 5 | 816 | 119 | 15% | 615 | 1065 | 450 | 55% |
| 6 | 820 | 106 | 13% | 630 | 1140 | 510 | 62% |
| 7 | 803 | 122 | 15% | 630 | 1095 | 465 | 58% |
| 8 | 761 | 141 | 18% | 600 | 1155 | 555 | 73% |
| 9 | 768 | 131 | 17% | 615 | 1035 | 420 | 55% |
| 10 | 745 | 137 | 18% | 525 | 1005 | 480 | 64% |

Dosatron Set Point 800 ppm

Thus, the use of the disclosed technology resulted in a significant reduction in the range and variation of PPA concentration delivered to the point of application, as compared to the range and variation seen when using a standard in-line injection method. Further, use of the disclosed technology resulted in a standard deviation of less than about 15%, which was beneath the comparable value for the comparative Dosatron technology.

As shown by the data above, the range (between minimum and maximum concentrations) for the D3S technology was less than 300 ppm. For the D3S technology, the range/average was less than about 45%, and the STD (standard deviation) for the D3S technology was less than about 100 ppm. All of the foregoing results compare favorably to the results attained using the conventional approach, which exhibited range values far in excess of the range values achieved by the disclosed technology, standard deviation values well in excess of the comparable values for the disclosed technology, and range/average values well above the comparable values for the disclosed technology.

As shown by the data above and as explained elsewhere in the present disclosure, the disclosed technology offers a number of advantages over existing approaches. First, the disclosed technology results in a significantly lower variation (as measured by, e.g., standard deviation) in chemical agent concentration at the point of use. This allows a user to have a significantly more predictable experience. This also, in turn, reduces the amount of wasted chemical agent used in a given system—with the variability inherent in conventional systems, a user must set a comparatively high concentration "set point" so as to ensure that the concentration of the agent of interest at the use location does not drop below a minimum threshold level. By comparison, because the disclosed technology has comparatively low variability, a user may set a concentration set point that is comparatively close to the lowest threshold level. This in turn saves both chemical agent as well as carrier.

The reduced variability of the disclosed technology also—by virtue of reducing the concentration and concentration variability of the chemical agent in the system—reduces user exposure to chemical agent vapor. This in turn reduces adverse health effects on the users, as well as reduces the need to remove or otherwise handle/process such vapors at the location of exposure.

EXAMPLE 3

Figure 3:
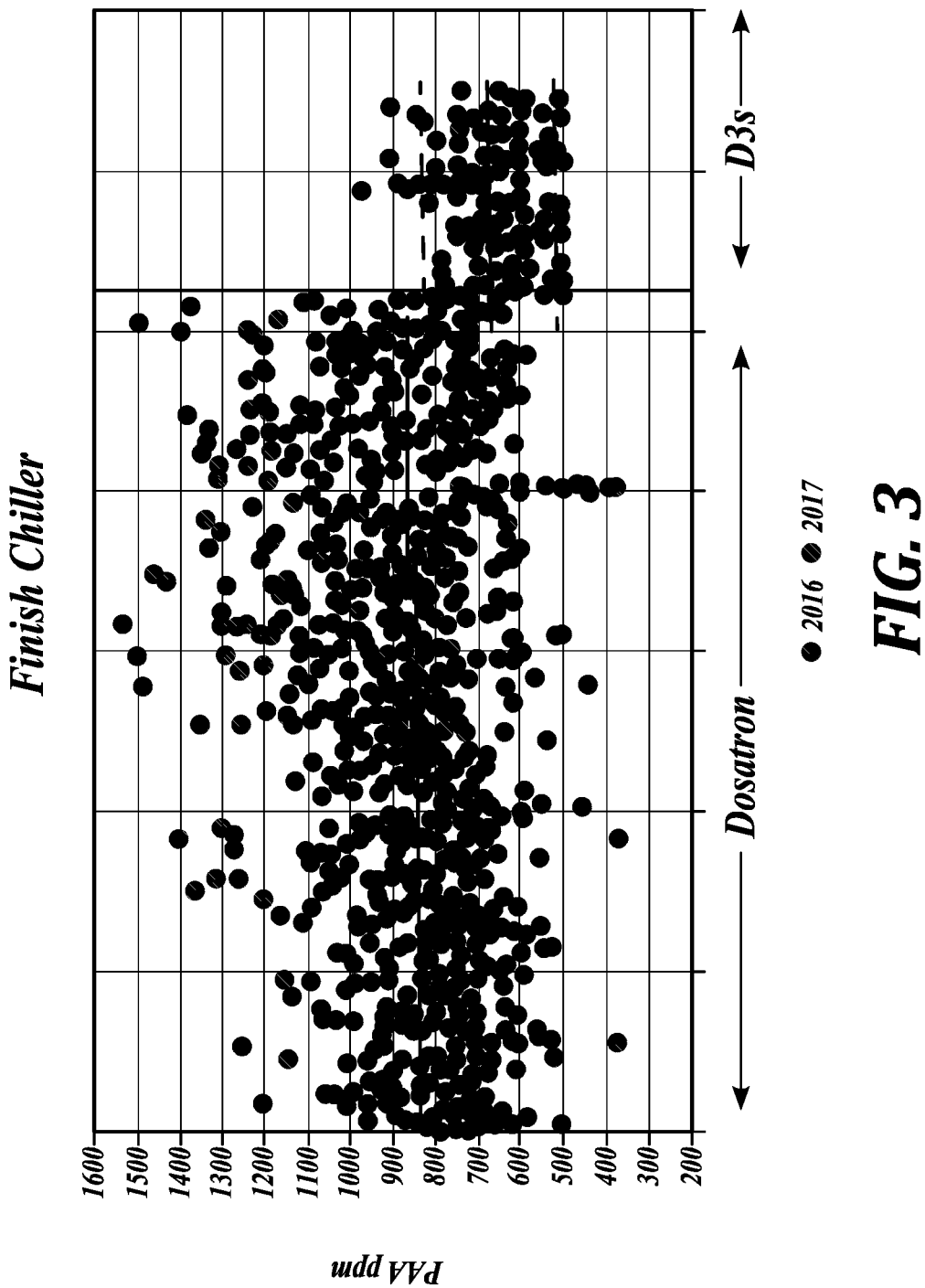
FIG. 3 provides further exemplary sampling data.

In this example, PAA in solution at the point of application was monitored in a commercial dip tank, using Lamotte™ hydrogen peroxide and PAA test kits; the kits were titration kits using a peracetic acid titrant and ferroin indicator.) As shown in FIG. 3 (showing daily PAA ppm as a function of sampling date and time), the PAA concentration dropped significantly along with variation in PPA concentration when the installation changed from a standard Dosatron system to a D3S system according to the present disclosure.

Exemplary Embodiments

The following embodiments are exemplary only and do not limit the scope of the present disclosure or the appended claims.

Embodiment 1. A continuous system, comprising: a mixing tank, the mixing tank being configured to receive a carrier from an input source of a carrier and being configured to receive a chemical agent from at least one input source of a chemical agent; a sensor in fluid communication with a recirculation line capable of fluid communication with the mixing tank, the recirculation line configured to receive process fluid from the mixing tank, and the sensor being configured to measure a level of the chemical agent in the recirculation line, the system being configured to give rise to a process fluid in the recirculation line that comprises the carrier and the chemical agent, the process fluid being characterized as being substantially homogeneous; the system being configured to release to a use location downstream from the mixing tank (a) process fluid from at least the mixing tank, (b) process fluid from at least the recirculation line, or (c) process fluid from at least both the mixing tank and recirculation line from the mixing tank; and optionally a mixer disposed in fluid communication with the mixing tank.

As described herein, the disclosed technology may operate in a continuous manner. The disclosed technology may also operate in a semi-continuous manner or even in a batch manner, depending on the needs of the user.

Sensors configured to measure a level of the chemical agent are known to those of ordinary skill in the art. As described elsewhere herein, the system may be configured such that the amount of carrier, chemical agent, or both may be modulated in response to information collected by the sensor concerning the level of the chemical agent in the recirculation line.

Embodiment 2. The continuous system of Embodiment 1, wherein the sensor is in communication with a mixing tank controller configured to modulate a flow to the mixing tank from the input source of the carrier, from the input source of the chemical agent, or any combination thereof. The mixing tank controller may be in communication with a valve, baffle, or other device that modulates flow.

Embodiment 3. The continuous system of Embodiment 2, wherein the mixing tank controller is configured to maintain a concentration range of the chemical agent in the recirculation line. The controller may modulate a flow of carrier, a flow of chemical agent, or any other flow that may enter the mixing tank.

Embodiment 4. The continuous system of any of Embodiments 1-3, further comprising a pump configured to transport contents of the mixing tank to the recirculation line. Suitable pumps will be known to those of ordinary skill in the art.

Embodiment 5. The continuous system of any of Embodiments 1-4, wherein the mixing tank comprises one or more passages placing a headspace of the mixing tank into fluid communication with the environment exterior to the mixing tank. A passage may be a pipe, conduit, or other passage. Although it is not necessary to vent the headspace of the mixing tank to the environment exterior to the mixing tank, it may be desirable to do so in some embodiments.

Embodiment 6. The continuous system of any of Embodiments 1-5, wherein the use location comprises a treatment module.

Embodiment 7. The continuous system of Embodiment 6, wherein the treatment module comprises a dip tank, a spray system, a hose, an application stream, or any combination thereof. Dip tanks are considered especially suitable, but other treatment modules may of course be used.

Embodiment 8. The continuous system of any of Embodiments 1-7, wherein the recirculation line is capable of fluid communication with the use location.

Embodiment 9. The continuous system of any of Embodiments 1-8, further comprising a sensor at the use location, the sensor being configured to measure a level of the chemical agent at the use location. The sensor may be in communication with one or more controllers of the system, and the one or more controllers may be configured to maintain—or change—the level of the chemical agent at the use location.

Embodiment 10. The continuous system of any of Embodiments 1-9, wherein the mixing tank controller is configured to maintain a range of the chemical agent in the recirculation line.

Embodiment 11. The continuous system of Embodiment 10, wherein the sensor is in communication with the mixing tank controller.

Embodiment 12. The continuous system of any of Embodiments 1-11, further comprising a flow control device disposed between the recirculation line and the use location, a flow control device disposed between the recirculation line and the mixing tank, or both.

Embodiment 13. The continuous system of Embodiment 12, wherein the flow control device comprises a valve. The valve may be manually actuated, but may also be automated, and may even in in communication with a controller that modulates the valve at least partially in response to a signal from one or more sensors.

Embodiment 14. The continuous system of any of Embodiments 1-13, wherein the process fluid is characterized as a substantially homogeneous mixture of the at least one carrier and the at least one or more chemical agents.

Embodiment 15. The continuous system of any of Embodiments 1-14, wherein the process fluid has a vapor pressure that is within about 20% of the vapor pressure of an ideal homogeneous mixture (using Raoult's Law), when measured at standard temperature and pressure, once every 30 minutes for 12 hours. The foregoing may suitably be measured under the system's operational flowrate conditions.

In some embodiments, the process fluid vapor pressure is within about 19, 18, 17, 16, 15, 14, 13, 12, 11, 10, 9, 8, 7, 6, 5, 4, 3, 2, or even 1% of the vapor pressure of the carrier. In some embodiments, the process fluid has a vapor pressure that is between from about 10 to about 20% of the vapor pressure of an ideal homogeneous mixture, when measured at standard temperature and pressure, once every 30 minutes for 12 hours Embodiment 16. The continuous system of Embodiment 15, wherein the process fluid has a vapor pressure that is within about 15% of the vapor pressure of an ideal homogeneous mixture, when measured at standard temperature and pressure, once every 30 minutes for 12 hours.

Embodiment 17. The continuous system of Embodiment 16, wherein the process fluid has a vapor pressure that is within about 10% of the vapor pressure of an ideal homogeneous mixture, when measured at standard temperature and pressure, once every 30 minutes for 12 hours.

Embodiment 18. The continuous system of any of Embodiments 1-17, wherein the system is configured to deliver the process fluid to the use location at a preselected flowrate and at a preselected concentration of chemical agent such that (a) the concentration of the chemical agent in the process fluid has a standard deviation of less than about 15%, as measured under standard temperature and pressure conditions once every 30 minutes for 12 hours, (b) the concentration of the chemical agent in the process fluid has a maximum variation of 50% from the preselected concentration of chemical agent, as measured under standard temperature and pressure conditions once every 30 minutes for 12 hours, (c) the concentration of the chemical agent in the process fluid has a maximum variation of 50% from the average concentration of chemical agent, as measured under standard temperature and pressure conditions once every 30 minutes for 12 hours, or any combination of (a), (b), and (c).

In some embodiments, the standard deviation above is between about 5 and about 15%, or between about 6 and 14%, or between about 7 and 13%, or between 8 and 12%, or between 9 and 11%, or even about 10%. In some embodiments, the concentration of the chemical agent in the process fluid has a maximum variation of from about 10 to about 50% from the preselected concentration of chemical agent, as measured under standard temperature and pressure conditions once every 30 minutes for 12 hours, or from about 20 to about 40%, or even from about 25 to 35%. In some embodiments, the concentration of the chemical agent in the process fluid has a maximum variation of from about 5 to about 50%, or from about 10 to about 40%, or from about 20 to about 30% of the average concentration of chemical agent, as measured under standard temperature and pressure conditions once every 30 minutes for 12 hours.

In some embodiments, the flowrate is about 1 gal/minute, and the pre-selected concentration of chemical agent is in the range of from about 550 to about 850 ppm. In some embodiments, the concentration of chemical agent is in the range of from about 600 to about 750 ppm, or even about 650 ppm.

Embodiment 19. The continuous system of any of Embodiments 1-18, wherein the process fluid is characterized as effecting an airborne concentration of the chemical agent, expressed in ppm, of less than about 0.05% of the concentration of the concentration of the chemical agent in the process fluid when measured under standard dip tank conditions. In some embodiments, the process fluid is characterized as effecting a concentration of the chemical agent, expressed in ppm, of less than about 0.05%, less than about 0.045%, less than about 0.04%, less than about 0.035%, or even less than about 0.03% of the concentration of the concentration of the chemical agent in the process fluid when measured under standard dip tank conditions.

In some embodiments, the system is configured such that the ratio of the airborne concentration of the chemical agent to the concentration of the chemical agent in the process fluid (both in ppm) is in the range of from about 0.00015 to about 0.0004, or from about 0.0002 to about 0.0003. The foregoing ratio may be, e.g., 0.00015, 0.00016, 0.00017, 0.00018, 0.00019, 0.0002, 0.00021, 0.00022, 0.00023, 0.00024, 0.00025, 0.00026, 0.00027, 0.00028, 0.00029, 0.00030, 0.00031, 0.00032, 0.00033, 0.00034, 0.00035, 0.00036, 0.00037, 0.00038, 0.00039, or even about 0.00040.

In some embodiments, the disclosed technology (e.g., system and/or method) may be configured to comply with certain sanitation performance criteria while also maintaining certain performance criteria related to vapor exposure. Exemplary criteria (also termed "2015 Criteria") are listed below; these criteria are from the Federal Register, Vol. 80, No. 16, page 3946 (Jan. 26, 2015).

TABLE 3 exemplary performance criteria (2015 Criteria):

| | Max Acceptable percent positive | |
|---|---|---|
| Product | *Salmonella* | *Campylobacter* |
| Broiler Carcass | 9.8 | 15.7 |
| Turkey Carcass | 7.1 | 5.4 |
| Comminuted Chicken | 25.0 | 1.9 |
| Comminuted Turkey | 13.5 | 1.9 |
| Chicken Parts | 15.4 | 7.7 |

In some embodiments, a system or method according to the present disclosure is configured to achieve the performance standard listed above in Table 3, as those tests would be performed on 48 samples taken once per hour over 48 hours.

In some embodiments, a system may be configured to achieve 50% (or less) of the performance standard listed above in Table 3 (also referred to as Category I in Federal Register, Vol. 80, No. 16, page 3947 (Jan. 26, 2015)), as those tests would be performed on 48 samples taken once per hour over 48 hours, e.g., under standard dip tank/spray cabinet conditions. As an example, a system may be configured to achieve a positive rate of 7.7% (i.e., 50% of 15.4%) for *Salmonella* on chicken parts treated by the system. As another example, a system may be configured to achieve a positive rate of 10% (i.e., 40% of 25%) for *Salmonella* on comminuted chicken treated by the system.

In some embodiments provided herein, the technology is configured to achieve a sterilization that is above 50% of the performance standard listed above in Table 3 while not exceeding the performance standard (also referred to as Category II in Federal Register, Vol. 80, No. 16, page 3947 (Jan. 26, 2015)), as those tests would be performed on 48 samples taken once per hour over 48 hours, under standard dip tank/spray cabinet conditions. In some embodiments, a system may be configured to achieve, e.g., 75% of the performance standard listed above in Table 3, as those tests would be performed on 48 samples taken once per hour over 48 hours. As one example, a system may be configured to achieve a positive rate of 11.6% (i.e., 75% of 15.4%) for *Salmonella* on chicken parts treated by the system.

As described herein, the disclosed technology may be configured so as to achieve one or more of the performance standards set forth above in Table 3. The disclosed technology may also be configured so as to achieve 50% (or less) of one or more of the performance standards set forth above in Table 3 (i.e., one or more of the standards for one or more of the animal substrates listed). The disclosed technology may further be configured to exceed one or more of the performance standards set forth above in Table 3, e.g., a system that achieves a *Salmonella* rate on treated chicken parts of 18%, i.e., above the 15.4% figure in Table 3; this is referred to as Category III in Federal Register, Vol. 80, No. 16, page 3947 (Jan. 26, 2015)). (It should be understood that measurements may be performed on 48 samples taken once per hour over 48 hours, in a standard dip tank or spray cabinet. The measurements may be performed under standard dip tank conditions or standard spray cabinet conditions, as applicable.)

In some embodiments, the disclosed technology may be configured to comply with certain sanitation performance criteria while also maintaining certain chemical agent vapor performance criteria related to vapor exposure. In some embodiments, a system or method according to the present disclosure may be configured to achieve one or more of the performance standards listed (as Category I or even as Category II or III) above in Table 3 while also giving rise to a level of chemical agent vapor (e.g., for a chemical agent that is an oxidizing agent) at the use location that is less or equal to one or more of any NIOSH IDLH (Immediately Dangerous to Life or Health) level, any NIOSH REL (Recommended Exposure Limit) level (in terms of time-weighted average, short-term exposure limit, or both), any OSHA PEL (Permissible Exposure Limit) for that chemical agent (as of Nov. 1, 2017), or any other limitation identified elsewhere in the present disclosure (e.g., an AEGL-1, AEGL-2, AEGL-3, or other value from any reference provided herein), optionally as measured under standard dip tank or standard spray cabinet conditions, as applicable.

In an embodiment where PAA is the chemical agent, a system may be configured to use PAA as the chemical agent and then exhibit a PAA vapor level measured under, e.g., standard dip tank/spray cabinet conditions, of less than about 0.6 ppm (e.g., between about 0.05 and about 0.1, 0.15, or even 0.2 ppm, e.g., between about 0.075 and about 0.120 ppm) while meeting Category I, II, or III performance as set forth in Table 3 above, as those tests would be performed on 48 samples taken once per hour over 48 hours. In an embodiment where PAA is the chemical agent, a system may be configured to use PAA as the chemical agent and then exhibit a PAA vapor level measured under, e.g., standard dip tank/spray cabinet conditions, of less than 0.2 ppm while meeting Category I, II, or III performance as set forth in Table 3 above, as those tests would be performed on 48 samples taken once per hour over 48 hours. In an embodiment where PAA is the chemical agent, a system may be configured to use PAA as the chemical agent and then exhibit a PAA vapor level measured, e.g., under standard dip tank conditions, of less than about 0.17 ppm while meeting Category I, II, or III performance as set forth in Table 3 above.

Without being bound to any particular theory, the ability of the disclosed technology to satisfy certain sterilization performance criteria while also achieving comparatively low vapor levels of the chemical agent is related to the technology's ability to produce essentially homogeneous process fluid for use at the use location/application point.

Embodiment 20. The continuous system of Embodiment 19, wherein the process fluid is characterized as effecting an airborne concentration of the chemical agent, expressed in ppm, of between about 0.01 and about 0.05% of the concentration of the concentration of the chemical agent in the process fluid when measured under standard dip tank conditions.

Embodiment 21. The continuous system of any of Embodiments 1-20, wherein the chemical agent comprises one or more of cetylpyridinium chloride, quaternary ammonium, chloride, chlorine dioxide, bromide, potassium bromate, hydroxide, halogen, organic peroxide, inorganic peroxide, nitrogen dioxide, acid, chlorate, hypochlorite, or any combination thereof.

Embodiment 22. The continuous system of Embodiment 21, wherein the acid comprises an organic acid, a mineral acid, or both.

Embodiment 23. The continuous treatment system of Embodiment 22, wherein the acid comprises citric acid, lactic acid, acetic acid, phosphoric acid, sulfuric acid, hydrochloric acid, hypobromous acid, an oxyacid, a peroxy acid, an oxalic acid, formic acid, ascorbic acid, propionic acid, or any combination thereof.

Embodiment 24. The continuous system of Embodiment 21, wherein the acid comprises peracetic acid.

Embodiment 25. The continuous system of Embodiment 24, wherein the system is configured to give rise to an concentration of peracetic acid in the process fluid delivered to the use location of from about 10 to about 1200 ppm, from about 20 to about 1000 ppm, from about 50 to about 900 ppm, from about 100 to about 800 ppm, from about 300 to about 700 ppm, or even from about 400 to about 600 ppm. In an embodiment where the use location is a dip tank, the measurement may be performed under standard dip tank conditions. In an embodiment where the use location is a spray cabinet, the measurement may be performed under standard spray cabinet conditions.

Embodiment 26. The continuous system of Embodiment 24, wherein the system is configured to give rise to an airborne concentration of peracetic acid in the use location of from about 0.075 to about 5.0 ppm, e.g., about 0.075 to about 5 ppm, from about 0.08 to about 4 ppm, from about 0.09 to about 2 ppm, or even from about 0.9 to about 1.3 ppm. In an embodiment where the use location is a dip tank, the measurement may be performed under standard dip tank conditions. In an embodiment where the use location is a spray cabinet, the measurement may be performed under standard spray cabinet conditions.

Embodiment 27. A method, comprising: in a mixing tank, mixing a carrier and a chemical agent so as to give rise to a process fluid that is characterized as substantially homogeneous; transporting at least some of the process fluid to a recirculation line in fluid communication with the mixing tank; determining a level of the chemical agent in the process fluid in the recirculation line; optionally changing the concentration of the chemical agent in the process fluid based at least in part on the level of the chemical agent in the recirculation line; and communicating at least some of the process fluid to a use location.

Embodiment 28. The method of Embodiment 27, wherein the process fluid is communicated to the use location at a preselected flowrate and at a preselected concentration of chemical agent such that (a) the concentration of the chemical agent in the process fluid has a standard deviation of less than about 15%, as measured under standard temperature and pressure conditions under standard dip tank conditions) once every 30 minutes for 12 hours, (b) the concentration of the chemical agent in the process fluid has a maximum variation of 50% from the preselected concentration and/or average concentration of chemical agent, as measured under standard temperature and pressure conditions (e.g., under standard dip tank conditions) once every 30 minutes for 12 hours, (c) the process fluid communicated to the use location is characterized as effecting an airborne concentration of the chemical agent, expressed in ppm, of less than about 0.05% of the concentration of the concentration of the chemical agent in the process fluid when measured under standard dip tank conditions, (d) the process fluid has a vapor pressure that is within about 20% of the vapor pressure of the at least one carrier, when measured at standard temperature and pressure, once every 30 minutes for 12 hours, (e) the process fluid has a vapor pressure that is less than about 90% of the vapor pressure of the chemical agent, when measured at standard temperature and pressure, once every 30 minutes for 12 hours, or any combination of (a), (b), (c), (d), and (e).

In some embodiments, the standard deviation above is between about 5 and about 15%, or between about 6 and 14%, or between about 7 and 13%, or between 8 and 12%, or between 9 and 11%, or even about 10%. In some embodiments, the concentration of the chemical agent in the process fluid has a maximum variation of from about 10 to about 50% from the preselected concentration of chemical agent, as measured under standard temperature and pressure conditions once every 30 minutes for 12 hours, or from about 20 to about 40%, or even from about 25 to 35%. In some embodiments, the concentration of the chemical agent in the process fluid has a maximum variation of from about 5 to about 50%, or from about 10 to about 40%, or from about 20 to about 30% of the average concentration of chemical agent, as measured under standard temperature and pressure conditions once every 30 minutes for 12 hours.

In some embodiments, the use location is effective to meet one or more of the 2015 Criteria for *Salmonella*, Campylobacter, or both for one or more of broiler carcass, turkey carcass, comminuted chicken, comminuted turkey, or chicken parts, as those tests would be performed on 48 samples taken once per hour over 48 hours. In some embodiments, the use location is effective to meet the one or more of the 2015 Criteria at a Category I level. In some embodiments, the use location is effective to meet the one or more of the 2015 Criteria at a Category II level. In other embodiments, the use location is effective to meet the one or more of the 2015 Criteria at a Category III level.

In some embodiments, the vapor level of the chemical agent at the use location, is less or equal to one or more of any NIOSH IDLH (Immediately Dangerous to Life or Health) level, any NIOSH REL (Recommended Exposure Limit) level, or any OSHA PEL (Permissible Exposure Limit) for that chemical agent (as of Nov. 1, 2017). (The vapor level may also be below any other limitation identified elsewhere in the present disclosure (e.g., an AEGL-1, AEGL-2, AEGL-3, or other value from any reference provided herein).)

It should be understood that the unique features of the disclosed technology allow for meeting the 2015 Criteria (at, e.g., a Category I or Category II level) while also providing for chemical agent vapor levels that are at or below certain threshold values, e.g., one or more of any NIOSH IDLH (Immediately Dangerous to Life or Health) level, any NIOSH REL (Recommended Exposure Limit) level, or any OSHA PEL (Permissible Exposure Limit) for that chemical agent (as of Nov. 1, 2017).

Embodiment 29. The method of any of Embodiments 27-28, further comprising contacting the process fluid at the use location to a portion of an animal.

The disclosed technology may be applied to, e.g., whole animals (e.g., whole chickens), animal carcasses, or animal parts (e.g., chicken legs). The disclosed technology may be applied to beef, pork, poultry, or other meats, although the presently disclosed technology may be applied to other substrates besides meats.

Embodiment 30. The method of any of Embodiments 27-29, wherein a chemical agent comprises cetylpyridinium chloride, quaternary ammonium, chloride, chlorine dioxide, bromide, potassium bromate, hydroxide, halogen, organic peroxide, inorganic peroxide, nitrogen dioxide, acid, chlorate, hypochlorite, or any combination thereof.

Embodiment 31. The method of Embodiment 30, wherein the acid comprises an organic acid, a mineral acid, or both.

Embodiment 32. The method of Embodiment 31, wherein the acid comprises citric acid, lactic acid, acetic acid, phosphoric acid, sulfuric acid, hydrochloric acid, hypobromous acid, an oxyacid, a peroxy acid, oxalic, formic, ascorbic, propionic, or any combination thereof.

Embodiment 33. The method of any of Embodiments 27-32, wherein the contacting comprises spraying, dipping, or both.

Embodiment 34. The method of any of Embodiments 27-33, wherein the chemical agent comprises peracetic acid.

Embodiment 35. A method, comprising: introducing to a mixing tank an amount of a carrier and a chemical agent so as to give rise to a process fluid; transporting at least some of the process fluid to a recirculation line in fluid communication with the mixing tank; measuring a level of the chemical agent in the process fluid of the recirculation line; based at least in part on the level of the chemical agent in the fluid of the recirculation line, transporting at least some of the process fluid in of the recirculating line to a use location; and exposing a sample at the use location to the process fluid.

Embodiment 36. The method of Embodiment 35, further comprising adjusting at least one of the amount of carrier and the amount of the chemical agent introduced to the mixing tank in response to the level of the chemical agent in the process fluid of the recirculation line.

Embodiment 37. The method of Embodiment 36, wherein the amount of the chemical agent is adjusted by introducing additional chemical agent at the mixing tank, at the recirculation line, or both.

Embodiment 38. The method of any of Embodiments 35-37, wherein the adjusting is effected by a controller in communication with a sensor configured to measure a level of the chemical agent in the recirculation line.

Embodiment 39. The method of Embodiment 35, wherein the controller is in communication with one or more devices configured to modulate one or more of the amount of carrier and the amount of the chemical agent.

Embodiment 40. The method of any of Embodiments 35-39, further comprising transporting at least some of the process fluid of the recirculation line to the mixing tank.

Embodiment 41. The method of Embodiment 40, wherein the transporting at least some of the process fluid of the recirculation line back to the mixing tank is based at least in part on the level of the one or more chemical agents in the process fluid of the recirculation line.

Embodiment 42. The method of any of Embodiments 35-41, further comprising placing a headspace of the mixing tank into fluid communication with the environment exterior to the mixing tank.

Embodiment 43. The method of any of Embodiments 35-42, further comprising removing at least some of a gas in a headspace of the mixing tank to the environment exterior to the mixing tank.

Embodiment 44. A method, comprising: contacting a first flow of process fluid having a first content of one or more chemical agents and a second flow of a process fluid having a second content of one or more chemical agents so as to form a combined flow, the first flow of process fluid originating from a first mixing tank and the second flow of process fluid originating from a second mixing tank; assaying a level of one or more chemical agents in the combined flow; and modulating the first flow, the second flow, or both in response to the level of one or more chemical agents in the combined flow.

Embodiment 45. The method of Embodiment 44, further comprising transporting the combined flow to a use location.

Embodiment 46. The method of any of Embodiments 44-45, further comprising addition of one or more chemical agents to the first mixing tank, to the first flow, to the second mixing tank, to the second flow, to the combined flow, or any combination thereof.

Embodiment 47. The method of any of Embodiments 44-46, further comprising addition of carrier to the first mixing tank, to the first flow, to the second mixing tank, to the second flow to the combined flow, or any combination thereof.

Embodiment 48. A method, comprising: mixing a carrier and a chemical agent so as to give rise to a substantially homogeneous process fluid, the chemical agent optionally comprising (a) an oxidizing agent or (b) one or more of cetylpyridinium chloride, quaternary ammonium, chloride, chlorine dioxide, bromide, potassium bromate, hydroxide, halogen, organic peroxide, inorganic peroxide, nitrogen dioxide, acid, chlorate, hypochlorite, or any combination thereof; transporting at least some of the process fluid to a recirculation line in fluid communication with the mixing tank; sampling at least some of the process fluid in the recirculation line to determine a level of the chemical agent in the process fluid; optionally changing the concentration of the chemical agent in the process fluid based at least in part on the level of the chemical agent in the recirculation line; and communicating at least some of the process fluid to a use location.

Embodiment 49. The method of Embodiment 48, wherein the use location is effective to meet one or more of the 2015 Criteria for *Salmonella* for one or more of broiler carcass, turkey carcass, comminuted chicken, comminuted turkey, or chicken parts, as those tests would be performed on 48 samples taken once per hour over 48 hours.

Embodiment 50. The method of Embodiment 49, wherein the use location is effective to meet one or more of the 2015 Criteria at a Category I level or Category II level for *Salmonella* for one or more of broiler carcass, turkey carcass, comminuted chicken, comminuted turkey, or chicken parts, as those tests would be performed on 48 samples taken once per hour over 48 hours. The use location may also be effective to meet Category III for *Salmonella* for the 2015 Criteria.

Embodiment 51. The method of any of Embodiments 48-50, wherein the use location is effective to meet the 2015 Criteria for Campylobacter for one or more of broiler carcass, turkey carcass, comminuted chicken, comminuted turkey, or chicken parts, as those tests would be performed on 48 samples taken once per hour over 48 hours.

Embodiment 52. The method of any of Embodiments 48-50, wherein the use location is effective to meet the 2015 Criteria for Campylobacter at a Category I or Category II level for one or more of broiler carcass, turkey carcass, comminuted chicken, comminuted turkey, or chicken parts, as those tests would be performed on 48 samples taken once per hour over 48 hours.

Embodiment 53. The method of any of Embodiments 48-52, wherein the vapor level of the chemical agent at the use location, is less or equal to one or more of any NIOSH IDLH (Immediately Dangerous to Life or Health) level, any NIOSH REL (Recommended Exposure Limit) level, or any OSHA PEL (Permissible Exposure Limit) for that chemical agent (as of Nov. 1, 2017), or any other limitation identified elsewhere in the present disclosure (e.g., an AEGL-1, AEGL-2, AEGL-3, or other value from any reference provided herein).

Embodiment 54. The method of Embodiment 53, wherein the chemical agent is an oxidizing agent.

Embodiment 55. The method of any of Embodiments 48-54, wherein the chemical agent is peracetic acid and wherein the vapor level of peracetic acid at the use location is between about 0.075 and about 0.2 ppm, e.g., measured under standard dip tank conditions or under standard spray cabinet conditions.

Embodiment 56. The continuous system of any of Embodiments 1-26, wherein the use location is effective to meet one or more of the 2015 Criteria for *Salmonella* for one or more of broiler carcass, turkey carcass, comminuted chicken, comminuted turkey, or chicken parts, as those tests would be performed on 48 samples taken once per hour over 48 hours.

Embodiment 57. The continuous system of Embodiment 56, wherein the use location is effective to meet one or more of the 2015 Criteria at a Category I level or Category II level for *Salmonella* for one or more of broiler carcass, turkey carcass, comminuted chicken, comminuted turkey, or chicken parts, as those tests would be performed on 48 samples taken once per hour over 48 hours.

Embodiment 58. The continuous system of any of Embodiments 56-57, wherein the use location is effective to meet the 2015 Criteria for Campylobacter for one or more of broiler carcass, turkey carcass, comminuted chicken, comminuted turkey, or chicken parts, as those tests would be performed on 48 samples taken once per hour over 48 hours.

Embodiment 59. The continuous system of any of Embodiments 56-58, wherein the use location is effective to meet the 2015 Criteria for Campylobacter at a Category I or Category II level for one or more of broiler carcass, turkey carcass, comminuted chicken, comminuted turkey, or chicken parts, as those tests would be performed on 48 samples taken once per hour over 48 hours.

Embodiment 60. The continuous system of any of Embodiments 56-59, wherein the vapor level of the chemical agent at the use location, is less or equal to one or more of any NIOSH IDLH (Immediately Dangerous to Life or Health) level, any NIOSH REL (Recommended Exposure Limit) level, or any OSHA PEL (Permissible Exposure Limit) for that chemical agent (as of Nov. 1, 2017).

Embodiment 61. The continuous system of Embodiment 60, wherein the chemical agent is an oxidizing agent.

Embodiment 62. The continuous system of any of Embodiments 56-61, wherein the chemical agent is peracetic acid and wherein the vapor level of peracetic acid at the use location is between about 0.075 and about 0.2 ppm.

SUMMARY OF ADVANTAGES

Thus, the presently disclosed technology provides a number of advantages over existing approaches:

Reduction in vapor pressure of the process fluid, leading to a reduction in volatiles at the point of application and improved safety Improved control of concentration at the point of application, consistently lower volatiles, and lower usage rate resulting in improved safety and cost reduction (reduced consumption in both chemical and water)

The foregoing evaluation demonstrates that the presently disclosed technology is well-suited to applications where there are certain constraints on the vapor or other exposure levels of a particular chemical agent or chemical agents, as the disclosed technology can give rise to significant reductions in the levels of such vapors while at the same time allowing the user to maintain the necessary concentrations of the chemical agent in the process fluid.

As described herein, an embodiment of the disclosed technology may be configured so as to achieve one or more of the performance standards set forth above in Table 3. The disclosed technology may also be configured so as to achieve 50% (or less) of one or more of the performance standards set forth above in Table 3 (i.e., one or more of the standards for one or more of the animal substrates listed). The disclosed technology may further be configured to exceed one or more of the performance standards set forth above in Table 3, e.g., a system that achieves a *Salmonella* rate on treated chicken parts of 18%, i.e., above the 15.4% figure in Table 3; this is referred to as Category III in Federal Register, Vol. 80, No. 16, page 3947 (Jan. 26, 2015)). (It should be understood that measurements may be performed on 48 samples taken once per hour over 48 hours, in a standard dip tank or spray cabinet. The measurements may be performed under standard dip tank conditions or standard spray cabinet conditions, as applicable.)

In some embodiments, the disclosed technology may be configured to comply with certain sanitation performance criteria while also maintaining certain chemical agent vapor performance criteria related to vapor exposure. In some embodiments, a system or method according to the present disclosure may be configured to achieve one or more of the performance standards listed (as Category I or even as Category II or III) above in Table 3 while also giving rise to a level of chemical agent vapor (e.g., for a chemical agent that is an oxidizing agent) at the use location that is less or equal to one or more of any NIOSH (Immediately Dangerous to Life or Health) level, any NIOSH REL (Recommended Exposure Limit) level (in terms of time-weighted average, short-term exposure limit, or both), any OSHA PEL (Permissible Exposure Limit) for that chemical agent (as of Nov. 1, 2017), or any other limitation identified elsewhere in the present disclosure (e.g., an AEGL-1, AEGL-2, AEGL-3, or other value from any reference provided herein), optionally as measured under standard dip tank or standard spray cabinet conditions, as applicable.

What is claimed:

1. A continuous system, comprising:

a mixing tank, the mixing tank being configured to receive a carrier from an input source of a carrier and being configured to receive a chemical agent from at least one input source of a chemical agent;

a sensor in fluid communication with a recirculation line capable of fluid communication with the mixing tank, the recirculation line configured to receive process fluid from the mixing tank, and the sensor being configured to measure a level of the chemical agent in the recirculation line;

the system being configured to give rise to a process fluid in the recirculation line that comprises the carrier and the chemical agent, the process fluid being characterized as being substantially homogeneous;

the system being configured to release to a use location downstream from the mixing tank (a) process fluid from at least the mixing tank, (b) process fluid from at least the recirculation line, or (c) process fluid from at least both the mixing tank and recirculation line;

a mixer disposed in fluid communication with the mixing tank and connected to a mixing tank input stream, wherein the mixer is configured to receive the carrier and the chemical agent that have not yet reached the mixing tank, to mix the carrier and the chemical agent, and to communicate the mixed carrier and chemical agent to the mixing tank through the mixing tank input stream;

an analysis recycle stream connected to the sensor and configured to receive the process fluid from the recirculation line and configured to provide the process fluid to the mixing tank;

a pump configured to transport contents of the mixing tank to the recirculation line for receipt by the mixing tank through the analysis recycle stream; and a controller, in operative communication with the sensor and the pump, the controller configured to:

modulate a flow to the mixing tank from the input source of the carrier, from the input source of the chemical agent, or any combination thereof; and operate the pump to transport contents of the mixing tank to the recirculation line for receipt by the mixing tank through the analysis recycle stream.

2. The continuous system of claim 1, wherein the controller is configured to maintain a concentration range of the chemical agent in the recirculation line.

3. The continuous system of claim 1, wherein the use location comprises a treatment module.

4. The continuous system of claim 3, wherein the treatment module comprises a dip tank, a spray system, a hose, an application stream, or any combination thereof.

5. The continuous system of claim 3, further comprising a second sensor at the use location, the sensor being configured to measure a level of the chemical agent at the use location.

6. The continuous system of claim 5, wherein the controller is configured to maintain a range of the chemical agent in the recirculation line.

7. The continuous system of claim 6, wherein the second sensor is in communication with the controller.

8. The continuous system of claim 1, wherein the recirculation line is capable of fluid communication with the use location.

9. The continuous system of claim 1, further comprising a flow control device disposed between the recirculation line and the use location, a flow control device disposed between the recirculation line and the mixing tank, or both.

10. The continuous system of claim 1, wherein the process fluid has a vapor pressure that is within about 20% of the vapor pressure of an ideal homogeneous mixture.

11. The continuous system of claim 1, wherein the system is configured to communicate the process fluid to the use location at a preselected flowrate and at a preselected concentration of chemical agent such that (a) the concentration of the chemical agent in the process fluid has a standard deviation of less than about 15%, as measured under standard temperature and pressure conditions once every 30 minutes for 12 hours, (b) the concentration of the chemical agent in the process fluid has a maximum variation of 50% from the preselected concentration of chemical agent, as measured under standard temperature and pressure conditions once every 30 minutes for 12 hours, (c) the concentration of the chemical agent in the process fluid has a maximum variation of 50% from the average concentration of chemical agent, as measured under standard temperature and pressure conditions once every 30 minutes for 12 hours, or any combination of any of (a), (b), and (c).

12. The continuous system of claim 1, wherein the system is characterized as effecting an airborne concentration of the chemical agent, expressed in ppm, of less than about 0.05% of the concentration of the concentration of the chemical agent in the process fluid when measured under standard dip tank conditions.

13. The continuous system of claim 1, wherein the chemical agent comprises one or more of cetylpyridinium chloride, quaternary ammonium, chloride, chlorine dioxide, bromide, potassium bromate, hydroxide, halogen, organic peroxide, inorganic peroxide, nitrogen dioxide, acid, chlorate, hypochlorite, or any combination thereof.

14. The continuous system of claim 13, wherein the system is configured to give rise to a concentration of peracetic acid in the process fluid communicated to the use location of from about 10 to about 1200 ppm.

15. The continuous system of claim 13, wherein the system is configured to give rise to an airborne concentration of peracetic acid in the use location of from about 0.07 to about 5 ppm.

16. The continuous system of claim 1, further comprising a mixing tank input stream configured to communicate fluid to the mixing tank at an angle to give rise to circulating flow.

17. The continuous system of claim 16, wherein the mixing tank input stream is a first mixing tank input stream, the continuous system further comprising a second mixing tank input stream configured relative to the first mixing tank input stream to encourage mixing within the mixing tank.

18. The continuous system of claim 1, wherein the mixing tank comprises one or more passages placing a headspace of the mixing tank into fluid communication with an environment exterior to the mixing tank.

19. The continuous system of claim 1, wherein the process fluid is an aqueous solution.

20. A method, comprising
mixing, in a mixer, a carrier and a chemical agent, wherein the chemical agent comprises cetylpyridinium chloride, quaternary ammonium, chloride, chlorine dioxide, bromide, potassium bromate, hydroxide, halogen, organic peroxide, inorganic peroxide, nitrogen dioxide, acid, chlorate, hypochlorite, or any combination thereof;
in a mixing tank, mixing a combined flow of the carrier and the chemical agent so as to give rise to a process fluid that is characterized as substantially homogeneous, wherein the mixer is configured to receive the carrier and the chemical agent that have not yet reached the mixing tank;
transporting at least some of the process fluid to a recirculation line in fluid communication with the mixing tank;
determining a level of the chemical agent in the process fluid in the recirculation line;
transporting at least some of the process fluid of the recirculation line to the mixing tank;
optionally changing the concentration of the chemical agent in the process fluid based at least in part on the level of the chemical agent in the recirculation line; and
communicating at least some of the process fluid to a use location.

21. The method of claim 20, wherein the process fluid is communicated to the use location at a preselected flowrate and at a preselected concentration of chemical agent such that
(a) the concentration of the chemical agent in the process fluid has a standard deviation of less than about 15%, as measured under standard temperature and pressure conditions once every 30 minutes for 12 hours, (b) the concentration of the chemical agent in the process fluid has a maximum variation of 50% from the preselected concentration of chemical agent %, as measured under standard temperature and pressure conditions once every 30 minutes for 12 hours, (c) the process fluid communicated to the use location is characterized as effecting an airborne concentration of the chemical agent, expressed in ppm, of less than about 0.05% of the concentration of the concentration of the chemical agent in the process fluid when measured under standard dip tank conditions, (d) the process fluid has a vapor pressure that is within about 20% of the vapor pressure of the at least one carrier, when measured at standard temperature and pressure, once every 30 minutes for 12 hours, (e) the process fluid has a vapor pressure that is less than about 90% of the vapor pressure of the chemical agent, when measured at standard temperature and pressure, once every 30 minutes for 12 hours, or any combination of (a), (b), (c), (d), and (e).

22. A method, comprising:

mixing, in a mixer, a carrier and a chemical agent;

introducing to the mixing tank an amount of a combined flow of the carrier and the chemical agent so as to give rise to a process fluid, wherein the mixer is configured to receive through the carrier and the chemical agent that have not yet reached the mixing tank;

transporting at least some of the process fluid to a recirculation line in fluid communication with the mixing tank;

measuring a level of the chemical agent in the process fluid of the recirculation line;

transporting at least some of the process fluid of the recirculation line to the mixing tank;

based at least in part on the level of the chemical agent in the fluid of the recirculation line, transporting at least some of the process fluid in of the recirculating line to a use location; and exposing a sample at the use location to the process fluid.

23. The method of claim 22, further comprising adjusting at least one of the amount of carrier and the amount of the chemical agent introduced to the mixing tank in response to the level of the chemical agent in the process fluid of the recirculation line.

24. The method of claim 23, wherein the amount of the chemical agent is adjusted by introducing additional chemical agent at the mixing tank, at the recirculation line, or both.

25. The method of claim 22, wherein the adjusting is effected by a controller in communication with a sensor configured to measure a level of the chemical agent in the recirculation line.

26. The method of claim 25, wherein the controller is in communication with one or more devices configured to modulate one or more of the amount of carrier and the amount of the chemical agent.

27. The method of claim 22, wherein the transporting at least some of the process fluid of the recirculation line back to the mixing tank is based at least in part on the level of the chemical agent in the process fluid of the recirculation line.

28. The method of claim 22, further comprising:
contacting a first flow of the process fluid having a first content of one or more chemical agents and a second flow of a process fluid having a second content of one or more chemical agents so as to form a combined flow, the first flow of the process fluid originating from a first mixing tank and the second flow of process fluid originating from a second mixing tank;
placing a headspace of the first mixing tank into fluid communication with an environment exterior to the first mixing tank;
removing at least some of a gas in a headspace of the first mixing tank to the environment exterior to the first mixing tank;
assaying a level of one or more chemical agents in the combined flow; and
modulating the first flow, the second flow, or both in response to the level of one or more chemical agents in the combined flow.

29. The method of claim 28, further comprising transporting the combined flow to a use location.

30. The method of claim 28, further comprising addition of one or more chemical agents to the first mixing tank, to the first flow, to the second mixing tank, to the second flow, to the combined flow, or any combination thereof.

31. The method of claim 28, further comprising addition of a carrier to the first mixing tank, to the first flow, to the second mixing tank, to the second flow to the combined flow, or any combination thereof.

* * * * *